US011016006B2

(12) United States Patent
Cheng et al.

(10) Patent No.: US 11,016,006 B2
(45) Date of Patent: May 25, 2021

(54) SYSTEM AND METHOD FOR REAL-TIME VOLUME CONTROL

(71) Applicant: Ventana Medical Systems, Inc., Tucson, AZ (US)

(72) Inventors: Yu-Heng Cheng, Northville, MI (US); Lisa A. Jones, Tucson, AZ (US); Jessica A. Wifall, Oro Valley, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 16/165,972

(22) Filed: Oct. 19, 2018

(65) Prior Publication Data

US 2019/0056295 A1 Feb. 21, 2019

Related U.S. Application Data

(63) Continuation of application No. PCT/EP2017/059769, filed on Apr. 25, 2017.
(Continued)

(51) Int. Cl.
*G06K 9/00* (2006.01)
*G01N 1/28* (2006.01)
(Continued)

(52) U.S. Cl.
CPC ..... *G01N 1/2813* (2013.01); *G01N 35/00663* (2013.01); *G01N 35/1009* (2013.01);
(Continued)

(58) Field of Classification Search
CPC ........ G01N 1/2813; G01N 1/30; G01N 1/312; G01N 35/1009; G01N 35/00663;
(Continued)

(56) References Cited

U.S. PATENT DOCUMENTS 5,650,332 A 7/1997 Gao et al.
6,097,831 A * 8/2000 Wieck .............. G01N 33/54366
382/128

(Continued)

FOREIGN PATENT DOCUMENTS

EP 2402813 A2 1/2012

OTHER PUBLICATIONS

International Search Report and Written Opinion dated Jul. 18, 2017 in corresponding PCT'EP2017/059769 filed Apr. 25, 2017, pp. 1-12.
(Continued)

*Primary Examiner* — Jose L Couso
(74) *Attorney, Agent, or Firm* — Ventana Medical Systems, Inc.

(57) ABSTRACT

A real-time imaging method and system for monitoring an assay process performed on a biological sample is described. In some embodiments, the method and system can be used to measure and control a reagent volume confined to a space between a cover and a substrate, which is particularly useful for controlling for evaporation in a thin-film staining environment. In particular embodiments, the disclosed reagent volume sensing and replenishment method and system are resistant to system noises generated during operation, for example, system noise due to vibration, field of view blockage by dispenser systems, differences in reagent colors, and changing tissue colors.

42 Claims, 13 Drawing Sheets

Related U.S. Application Data

(60) Provisional application No. 62/328,245, filed on Apr. 27, 2016.

(51) Int. Cl.
    *G06T 7/62* (2017.01)
    *G06T 7/246* (2017.01)
    *G01N 35/00* (2006.01)
    *G01N 35/10* (2006.01)
    *G06T 7/00* (2017.01)

(52) U.S. Cl.
    CPC ............ *G06T 7/0012* (2013.01); *G06T 7/246* (2017.01); *G06T 7/62* (2017.01); *G01N 2001/282* (2013.01); *G01N 2035/00673* (2013.01); *G01N 2035/1025* (2013.01); *G06T 2207/30168* (2013.01)

(58) Field of Classification Search
    CPC ......... G01N 35/1002; G01N 2001/282; G01N 2035/00673; G01N 2035/1025; G01N 15/1475; G06T 2207/30168; G06T 2207/30024; G06T 2207/10056; G06T 7/62; G06T 7/246; G06T 7/0012; G06T 7/11; G06T 7/194; G02B 21/26; G02B 21/125; G02B 21/365; G02B 21/34; G02B 21/362; G06K 9/00127; G06K 9/3216; G06K 9/00134; G06K 9/0014; Y10T 436/25; B01L 9/52; B01L 1/52; G06F 30/23; B65D 2203/04

See application file for complete search history.

(56) References Cited

U.S. PATENT DOCUMENTS

| | | | |
|---|---|---|---|
| 8,911,815 B2 | 12/2014 | Kram et al. | |
| 9,498,791 B2 | 11/2016 | Otter et al. | |
| 10,794,805 B2* | 10/2020 | Capps | G01N 1/312 |
| 2006/0178578 A1* | 8/2006 | Tribble | B65B 3/003 |
| | | | 600/432 |
| 2014/0320632 A1* | 10/2014 | Matthias | G01F 23/292 |
| | | | 348/86 |
| 2018/0372715 A1* | 12/2018 | Kluckner | G01N 21/314 |
| 2020/0278368 A1* | 9/2020 | Hopper | G01N 21/763 |
| 2020/0284639 A1* | 9/2020 | Knapp | G01F 23/22 |
| 2020/0348321 A1* | 11/2020 | Barnett | G01N 35/0099 |

OTHER PUBLICATIONS

P. Kaewtrakulpong, R. Bowden, "An 5 Improved AdaptiveBackground Mixture Model for Realtime Tracking with Shadow Detection", In Proc. 2nd European Workshop on Advanced Video Based Surveillance Systems, AVBS01, Video Base Surveillance Systems: Compute Vision and Distributed Processing (Sep. 2001).

Stauffer, C. and Grimson, W.E.L., Adaptive Background MixtureModels for Real-Time Tracking, Computer Visions and Pattern Recognition, IEEE Computer Society Conference on, vol. 2 (Aug. 5, 1999), pp. 2246-2252 vol. 2.

* cited by examiner

Fluid direction

Fluid direction

Fluid direction

Fluid direction

SYSTEM AND METHOD FOR REAL-TIME VOLUME CONTROL

RELATED APPLICATION DATA

This a continuation of POT Application No. PCT/EP2017/059769, filed Apr. 25, 2017, which claims priority from and the benefit of U.S. Provisional Patent Application No. 62/328,245, filed Apr. 27, 2016. The contents of these prior applications are incorporated by reference herein.

FIELD

The present invention relates to systems and methods for volume sensing of reagents, in particular for sensing of on-slide volume of reagents during a tissue staining process.

BACKGROUND

A biological assay is an analytic procedure that can be performed to measure or observe one or more properties associated with a biological specimen, such as its molecular content or cellular structure. For example, cellular specimens such as tissue sections and cell samples may be prepared for microscopic analysis by applying one or more fluids to the specimens while they are supported on a substrate. Microscope slides bearing cellular specimens are often treated with one or more dyes or other reagents to add color and contrast to otherwise transparent or invisible cell and cell components. Immunohistochemical (IHC) and in situ hybridization (ISH) staining procedures can also be used to process cellular specimens to reveal to the presence, the location, and the distribution of proteins and nucleic acids, respectively, within the specimen.

Assay and platform development, as well as commercial assay testing, can be costly in terms of time and resources because reproducibility and precision is currently established through pathologist evaluations. The success of a slide-based assay is evaluated by a pathologist only after the assay is completed, which can take upwards of 12 hours for certain ISH assays, with multi-target protocols taking even more time. Any disruptions or inconsistencies in the tissue staining process are only discovered thereafter, and often the exact cause requires extensive additional analyses. Overall, such a process creates problems with regard to wasted, expensive tissue samples, and increased development time along with its associated costs.

Evaporation of reagent fluids is one mechanism by which changes in reagent concentration can occur. For example, evaporation of a solvent from a reagent can cause an increase in concentration of reagent components, particularly at the edges of a reagent fluid volume. Likewise, uptake of reagent components by the biological sample under analysis can lead to localized depletion of one or more of the reagent components. Since this uptake can be heterogeneous across, for example, a tissue sample, concentration gradients can develop which can cause differential extent of staining along one or more of such gradients. Furthermore, since uptake and other interactions and reactions typically accelerate as concentrations increase, evaporation can also lead to gradients and inconsistent staining. Overall, changes in reagent concentration over time and space can result in inconsistent staining across a tissue sample. In the case of evaporation, it is also possible for the tissue may dry out, in part, or whole, making the tissue sample unusable. Regardless of cause, having to wait for pathological analysis to determine that concentration changes or tissue damage are occurring leads to a great amount of wasted time and further consumption of costly and/or rare samples.

Once a commercial assay is implemented on a commercial instrument, success of an assay continues to be assessed by a pathologist. Using troubleshooting guides and their own knowledge, pathologists can provide feedback to the laboratory performing the assays and request a new sample. Again, this leads to a substantial delay, but in this case, the delay impacts the time it takes for a patient to receive results that could have major implications for their quality of life.

Current solutions to mitigate evaporation during processing rely upon replenishing fluids based an estimated evaporation rate, which rate depends on local humidity and temperature. Since humidity and temperature can vary during an assay processing time, such estimated replenishment rates of the reagent may not be accurate. Furthermore, the replenishment rate may neither be determined for each slide, nor determined in real-time. Hence, there is a need for a method and system that can sense fluid volume and provide accurate replenishment of liquids in real-time.

SUMMARY

Disclosed herein are a method, a computer program product and a system for sensing fluid volume and providing replenishment amounts in real-time such so that processing conditions that could lead to flawed analysis results are avoided before they happen. Furthermore, the disclosed method, program product and system can help avoid the need to wait until a pathologist has examined a sample in order to determine that a processing error has occurred.

According to one aspect, a method of estimating a replenishment amount of a fluid to be dispensed onto a substrate holding a biological sample undergoing an assay is disclosed. The method includes capturing an image of the fluid dispensed on the substrate holding the biological sample (such as a tissue or cytology sample mounted on a microscope slide) with an imaging system to produce a captured image. In particular the fluid can be confined to a space between the substrate and a cover, such as in a thin-film staining system where an opposable surface is spaced from the substrate to form a low volume space (such as a capillary space) in which the assay steps are performed. The captured image is analyzed (such as by image analysis methods) to identify fluid boundaries of the fluid dispensed on the substrate and confined to the space between the substrate and the cover. The fluid boundaries that are identified provide a fluid width that can then be used to calculate a fluid volume of the fluid dispensed on the substrate. For example, the determined width can be compared to a calibration curve built by measuring fluid widths corresponding to know volumes and fitting the relationship with a function, such as a first order (linear) function. Alternatively, the geometric dimensions of the space between a substrate and a cover can be used with the observed width to calculate a volume. Regardless of the method of calculating the fluid volume, this calculated fluid volume can be used to determine whether and in what amount additional fluid should be added in order to replenish any fluid lost, for example, through evaporation or other processes such as wicking or spillage. A replenishment amount of the fluid can be calculated by comparing a predetermined volume with the calculated fluid volume, wherein the difference between the calculated fluid volume and the predetermined volume represents the replenishment amount. In a particular embodiment, the method further includes replenishing the fluid volume by the replenishment amount. In this manner, any fluid lost can be replaced, thereby helping to ensure that enough of a fluid such as a reagent is in contact with the biological sample during the assay. Maintenance of the proper amount of fluid in contact with the biological sample in turn helps ensure the assay is proceeding as planned, and may avoid a delay in providing assay results that might otherwise occur if a problem (such as dried-out tissue) was discovered only after the entire assay process is finished.

In another aspect, system is disclosed for estimating a replenishment amount of a fluid dispensed onto a substrate containing a biological sample undergoing an assay, particularly where the fluid is confined to a space between the substrate and a cover. The overall system includes an image acquisition and storage system that itself includes a camera disposed above the substrate and the cover and at least two light sources. A first light source is positioned such that a first light emitted from the first light source is within a field of view (FOV) of the camera, and a second light source is positioned such that a second light emitted from the second light source is outside the field of view of the camera. The imaging arrangement is thereby configured to support dark-field imaging. The image analysis system further includes a processor operatively coupled to the image acquisition and storage system, a memory operatively coupled to the processor that is configured to store digitally-encoded instructions that, when executed by the processor, cause the processor to perform certain operations. The operations include capturing an image of the fluid dispensed on the substrate holding the biological sample using the camera to produce a captured image, analyzing the captured image to identify fluid boundaries of the fluid dispensed on the substrate and confined to the space between the substrate and the cover, calculating a fluid volume of the fluid dispensed on the substrate using a fluid width determined from the fluid boundaries, and calculating the replenishment amount of the fluid based on the calculated fluid volume and a predetermined fluid volume. In one embodiment, the replenishment amount is added using a replenishment dispenser of the system, such as automatically under the control of the processor and the memory further storing instructions to control the replenishment dispenser, in order to bring the fluid volume back up to the pre-determined volume.

In particular embodiments, use of dark field imaging to illuminate the edge of fluid boundaries and/or use of foreground motion detection to detect fluid boundaries in motion and/or use of a color-threshold to aid detection of colored fluids all combine to reliably aid detection of fluid width and provide calculated fluid volumes of a wide variety of fluids in real time with minimal error (such as with an error of less than about 1.5%). Moreover, the disclosed method and system are robust in that analysis is not affected by other system operations such as dispenser movement, changes in tissue color, and equipment vibration.

In other aspects, a computer program product including instructions that cause the disclosed system to carry out the disclosed method and a (non-transient) computer readable medium storing the instructions for performing the disclosed method are provided.

BRIEF DESCRIPTION OF THE DRAWINGS

Additional embodiments and aspects will become apparent from a consideration of the following detailed description presented in connection with the accompanying drawings in which.

DETAILED DESCRIPTION

Figure 1:
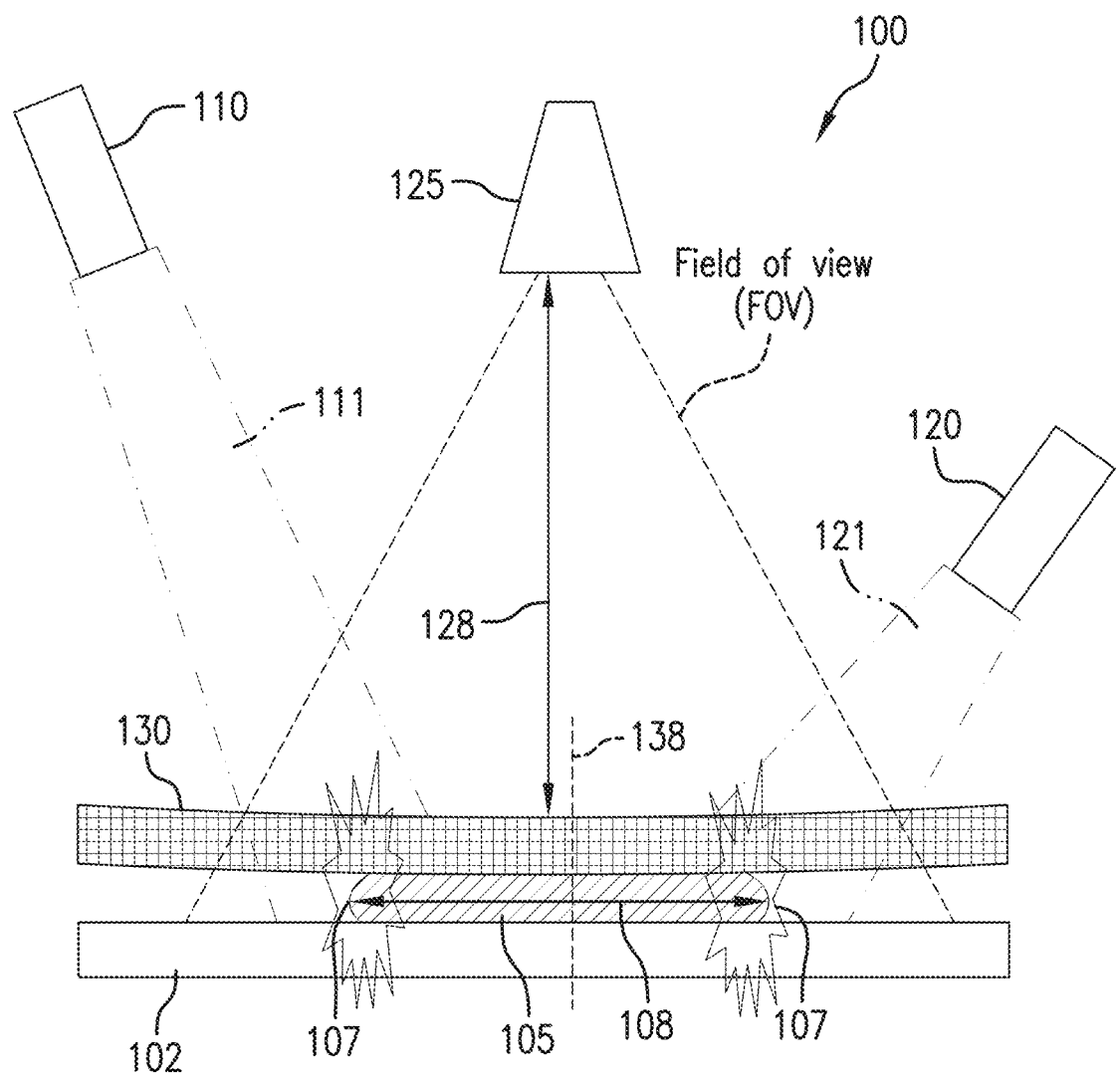
FIG. 1 shows a side-view of an exemplary camera and lighting arrangement according to a disclosed embodiment.

Any feature or combination of features described herein are included within the scope of disclosure provided that the features included in any such combination are not mutually inconsistent, as will be apparent from the context, this specification, and the knowledge of one of ordinary skill in the art. Additional advantages and aspects will become apparent in view of the following detailed description and claims.

In one aspect, a method of estimating a replenishment amount of a fluid to be dispensed onto a substrate holding a biological sample undergoing an assay is disclosed. The method includes, capturing an image of the fluid dispensed on the substrate holding the biological sample with an imaging system to produce a captured image, wherein the fluid is confined to a space between the substrate and a cover; analyzing the captured image to identify fluid boundaries of the fluid dispensed on the substrate and confined to the space between the substrate and the cover; calculating a fluid volume of the fluid dispensed on the substrate using a fluid width determined from the fluid boundaries; and calculating the replenishment amount of the fluid based on the calculated fluid volume and a predetermined fluid volume.

As used herein, "fluid width" refers to one or more observed widths of a liquid present in a space between a cover and an underlying substrate, and more generally to one or more measurements that permit a calculation of the area occupied by the liquid as observed in a captured image. In its simplest form, a fluid can appear to occupy a square or rectangular form beneath the cover and a single width measured for the liquid is sufficient to support a volume calculation based on a known geometry of the space between the cover and the substrate. Alternatively, a single width could be utilized with a calibration curve built by placing known volumes into the space and measuring the corresponding widths observed. A mathematical fit (such as first or higher order functions, logarithmic, exponential and other know curve fitting functions) to the relationship of the "fluid width" versus volume can provide the calibration curve upon which the calculated volume can be determined from a measured fluid width. It is also possible that the fluid could appear generally as an oval or other geometric shape in response to the fluid's interaction with the substrate or because the fluid pulls away from edges of the space between a cover and a substrate as the fluid is lost, for example, by evaporation. As such, the image can provide a basis for calculating the volume of multiple portions of the fluid body from several widths in one or more directions, and combining these to provide the calculated volume. In even more sophisticated embodiments, the area occupied by a fluid in the space between a cover and an underlying substrate can be determined by summing the areas of a set of geometric shapes into which the liquid body or bodies can be divided by image analysis methods. Overall, the geometry of the shape of the space between a cover and a substrate can be determined and used in combination with one or more "fluid widths" to estimate the volume of the fluid in the space.

In particular embodiments, the disclosed method further includes performing a frame check to detect if there is an error or abnormality in the captured image, wherein if the frame check detects an error or abnormality in the captured image, repeatedly capturing images until the captured image passes the frame check or a maximum number of frame check error iterations is reached. In a more particular embodiment, wherein the cover is a moving cover that moves the fluid across the substrate, the method further includes, determining a fluid position of the fluid dispensed on the substrate and comparing the fluid position to a predetermined position. If the fluid position is outside of the predetermined position, images can be repeatedly captured until the fluid is moved to the predetermined position by the moving cover and once the fluid position is in the predetermined position, the fluid volume can be calculated. In another more particular embodiment, performing the frame check comprises calculating a ratio of bright pixels to dark pixels in the captured image, wherein if the ratio of bright pixels to dark pixels is greater than about 50% in the captured image, the image fails the frame check, and if the ratio of bright pixels to dark pixels is less than about 50% in the captured image, the image passes the frame check. In still another more particular embodiment, performing the frame check comprises comparing the calculated fluid volume to the predetermined fluid volume, or at least one previously calculated volume, to produce a volume difference, wherein if an absolute value of a ratio of the volume difference and the predetermined fluid volume or the previously calculated volume is greater than a difference calculated using a predetermined evaporation rate of the fluid the image fails the frame check. In an even further more particular embodiment, the disclosed method performing the frame check further comprises notifying a user if the maximum number of frame check error iterations, such as about five iterations, is reached.

In another particular embodiment, the imaging system includes a camera disposed above the cover and at least two light sources, wherein a first light source is positioned such that a first light emitted from the first light source is within a field of view (FOV) of the camera, and wherein a second light source is positioned such that a second light emitted from the second light source is outside the field of view of the camera to provide an imaging arrangement configured for dark-field imaging. In a more particular embodiment, dark-field imaging is used in the method to identify the fluid boundaries when analyzing the captured image. In another more particular embodiment, analyzing the captured image comprises applying foreground detection, such as motion-based foreground detection, to the captured image in order to identify the fluid boundaries. For example, when the fluid is a clear fluid motion-based foreground detection can be used to identify the fluid boundaries. In yet another more particular embodiment, wherein the fluid is a colored fluid, a color-threshold detection is used in the method to identify the fluid boundaries. Noise can also be removed from a background of the captured image. In another particular embodiment, a distance between the camera and the cover is between about 15 to about 20 inches (between about 38.1 cm to about 50.8 cm).

In another particular embodiment of the disclosed method, calculating the fluid volume can include comparing the fluid width to a calibration curve to provide the calculated fluid volume, wherein the calibration curve is prepared by plotting known fluid volumes against corresponding fluid widths. In a more particular embodiment, the calibration curve is a first-order calibration curve. In other particular embodiments, the disclosed method can further include detecting bubbles in the dispensed fluid confined to the space between the substrate and the cover by performing circle detection to identify bubbles in the captured image. Bubble volume can be compensated by calculating a number of bubbles and a bubble volume for each bubble, and then a total bubble volume is subtracted from the calculated volume determined using the fluid width to provide a corrected calculated volume. As shown in more detail below, using such a "bubble-compensated" volume to calculate the replenishment amount provides improved accuracy in the determined replenishment amount.

In another particular embodiment, the disclosed method further includes replenishing the fluid volume by the replenishment amount. Replenishment can be accomplished, such as automatically, with a fluid dispenser such as a robotic pipettor, a fluid line that feeds a fluid from reservoir, or a mechanical dispenser, or accomplished manually. The replenishment of a fluid such as a tissue staining reagent can be done by adding more of the same fluid, or the replenishment can be of a solvent, in which a reagent is dissolved or suspended, that has been lost, for example, due to evaporation.

In other particular embodiments, the disclosed method can further include using a position of a moving cover to determine the fluid position (which can be used to trigger image capture) because there is typically a correlation between a position of the moving cover and the fluid position. If the position of the moving cover is outside of a predetermined region, then the fluid position is outside of the predetermined position. In a more particular embodiment, the moving cover can include a fluid rolling cover and the predetermined region is off-set from a center line of the fluid rolling cover to compensate for a lag in a movement of the fluid position relative to a position of the fluid rolling cover. In even more particular embodiments, the disclosed method further includes determining a direction of movement of the fluid relative the center line of the fluid rolling cover when the fluid rolling cover is moving the fluid across the substrate.

In another aspect, a system is disclosed for estimating a replenishment amount of a fluid dispensed onto a substrate containing a biological sample undergoing an assay, wherein the fluid is confined to a space between the substrate and a cover. The disclosed system includes an image acquisition and storage system that itself includes a camera disposed above the substrate and the cover, and at least two light sources. A first light source is positioned such that a first light emitted from the first light source is within a field of view (FOV) of the camera and a second light source is positioned such that a second light emitted from the second light source is outside the field of view of the camera, thereby producing an imaging arrangement configured for dark-field imaging. The system further includes a processor operatively coupled to the image acquisition and storage system, a memory operatively coupled to the processor. The memory is configured to store digitally-encoded instructions that, when executed by the processor, cause the processor to perform certain operations. These operations include capturing an image of the fluid dispensed on the substrate holding the biological sample using the camera to produce a captured image, analyzing the captured image to identify fluid boundaries of the fluid dispensed on the substrate and confined to the space between the substrate and the cover, calculating a fluid volume of the fluid dispensed on the substrate using a fluid width determined from the fluid boundaries, and calculating the replenishment amount of the fluid based on the calculated fluid volume and a predetermined fluid volume. In particular embodiments a distance between the camera and the cover is between about 15 to about 20 inches (between about 38.1 cm to about 50.8 cm). In one embodiment the system further includes a replenishment dispenser under control of the processor, wherein the memory is further configured to store digitally-encoded instructions that, when executed by the processor, cause the replenishment dispenser to deliver the replenishment amount of the fluid to the space between the cover and the substrate.

In a particular embodiment of the disclosed system, the memory is further configured to store digitally-encoded instructions that, when executed by the processor, cause the processor to perform operations including performing a frame check to detect if there is an error or abnormality in the captured image, wherein if the frame check detects an error or abnormality in the captured image, the processor repeatedly captures images using the camera until the captured image passes the frame check or a maximum number of frame check error iterations is reached. In a more particular embodiment, the memory is further configured to store digitally-encoded instructions that, when executed by the processor, cause the processor to perform operations comprising calculating a ratio of bright pixels to dark pixels in the captured image, wherein if the ratio of bright pixels to dark pixels is greater than about 50% in the captured image, the image fails the frame check, and if the ratio of bright pixels dark pixels is less than about 50% in the captured image, the image passes the frame check. In another more particular embodiment, the memory is further configured to store digitally-encoded instructions that, when executed by the processor, cause the processor to perform operations comprising comparing the calculated fluid volume to the predetermined fluid volume or at least one previously calculated volume to produce a volume difference, wherein if an absolute value of a ratio of the volume difference and the predetermined fluid volume or the previously calculated volume is greater than a difference calculated using a predetermined evaporation rate of the fluid the image fails the frame check. In yet another more particular embodiment, the memory is further configured to store digitally-encoded instructions that, when executed by the processor, cause the processor to perform operations comprising notifying a user if the maximum number of frame check error iterations is reached. In other more particular embodiments, the maximum number of frame check error iterations is about five iterations.

In another embodiment of the disclosed system wherein the cover is a moving cover that moves the fluid across the substrate, the memory is further configured to store digitally-encoded instructions that, when executed by the processor, cause the processor to perform operations including, determining a fluid position of the fluid dispensed on the substrate and comparing the fluid position to a predetermined position. If the fluid position is outside of the predetermined position, the fluid is moved to the predetermined position by the moving cover; and, if the fluid position is in the predetermined position, calculating the fluid volume.

In particular embodiments of the disclosed system, the memory is further configured to store digitally-encoded instructions that, when executed by the processor, apply dark-field imaging is to identify the fluid boundaries. In other particular embodiments, the memory is further configured to store digitally-encoded instructions that, when executed by the processor, apply foreground detection to the captured image to identify the fluid boundaries. In more particular embodiments, the fluid for which a volume is calculated is a clear fluid and the memory is further configured to store digitally-encoded instructions that, when executed by the processor apply motion-based foreground detection to determine the fluid boundaries. In other more particular embodiments, the fluid for which a volume is calculated is a colored fluid and the memory is further configured to store digitally-encoded instructions that, when executed by the processor apply color-threshold detection to determine the fluid boundaries. In other embodiments, the memory is further configured to store digitally-encoded instructions that, when executed by the processor, remove noise from a background of the captured image.

In still other embodiments of the disclosed system, the memory is further configured to store digitally-encoded instructions that, when executed by the processor, cause the processor to perform operations including comparing the fluid width to a calibration curve to provide the calculated fluid volume, wherein the calibration curve is prepared by plotting known fluid volumes against corresponding fluid widths. In particular embodiments, the calibration curve is a first-order calibration curve.

In further embodiments of the system, the memory is further configured to store digitally-encoded instructions that, when executed by the processor, cause the processor to perform operations including detecting bubbles in the dispensed fluid confined to the space between the substrate and the cover by performing circle detection to identify bubbles in the captured image, compensating for bubble volume by calculating a number of bubbles and a bubble volume for each bubble, and subtracting a total bubble volume from the calculated volume determined using the fluid width to provide a corrected calculated volume, and using the corrected calculated volume to calculate the replenishment amount. In even further embodiments, an automated replenishment dispenser is also under the control of the processor, and the memory is further configured to store digitally-encoded instructions that, when executed by the processor, cause the processor to cause the replenishment dispenser to dispense the replenishment amount to the space between the cover and the substrate.

Although discussed below with respect to a particular system for applying fluids to substrate mounted biological samples that utilizes a curved cover that is "rolled" across a substrate, it is to be understood that the disclosed method and system can be utilized in any system that includes a substrate (such as a microscope slide or a mass-spectrometry sample substrate) and a cover (such as a coverslip) that is spaced apart from the substrate to form a space (such as a capillary space) into which a fluid to be applied to the biological sample can be placed. The cover can be stationary or coupled or otherwise moved by a mechanism that moves the cover to impart motion to the fluid. Examples of systems that include a stationary cover include those disclosed in US20140329270, US20150253225, US20130196339, US20030138353, U.S. Pat. No. 8,932,543, and US20150031071. Examples of systems that include a cover that is moved in an angular fashion to vary the height of the space between the cover and the substrate include U.S. Pat. Nos. 7,476,543, 8,454,908 and WO2006116039.

Referring now to FIG. 1, in some embodiments, an imaging system (100) can include a camera (125) and a front light source (110) and a back light source (120). In other embodiments, the imaging system can include more than one camera, more than one front light source and more than one back light source. In one embodiment, some or all of the components of the imaging system can be mounted on the sample processing system. The imaging system can be used to illuminate and capture images of one or more substrates in the sample processing system. The sample processing system can include a fluid motion mechanism to move fluid across the sample and a fluid exchange system that has a fluid dispenser to add fluid to the sample and a fluid removal device to remove fluid from the sample. In one embodiment, the fluid motion mechanism can include a fluid roller, i.e. a fluid rolling cover (130) or "ARC." Embodiments of the fluid rolling cover that can be used with the present method and system are described in commonly-assigned U.S. Patent Application Publication No. 2015/0323776, entitled "Specimen Processing Systems and Methods for Holding Slides" and published on Nov. 12, 2015, the specification of which is incorporated herein by reference. For example, the fluid rolling cover can be a surface, a tile, a strip, or any structure capable of manipulating the reagent fluids to process a specimen on a slide. The fluid rolling cover can have a non-planar fluid-manipulating surface that can roll or otherwise travel along the slide. The fluid rolling cover can be made, in whole or in part, of polymers, plastics, elastomers, composites, ceramics, glass, or any sufficiently translucent material that s chemically compatible with the reagent fluids and specimens.

In other embodiments, the fluid motion mechanism can include one or more staining cassettes having one or more samples undergoing an assay. Each of the tissue samples held by cassettes in the sample processing system can include a slide (102) holding one or more specimens to be analyzed by the assay. One or more fluids (105), such as reagents and/or stains, can be applied to the specimen by a fluid dispenser system. In one embodiment, the reagents and/or stains 56 can include, but are not limited to, antibody diluent, protease 3, reaction buffer, system fluid, HRP (horseradish peroxidase) inhibitors, antibodies, HQ linker, HRP multimers, $H_2O_2$, DAB (3,3'-Diaminobenzidine), copper reagent, Hematoxylin (HTX), probe reagent and bluing reagent. A cover can then be placed over the specimen and the reagent and/or stain. In some embodiments, the cover can be a clear or translucent solid plastic or acrylic, but may have different color tints, e.g., a yellow tint, in other embodiments. In a further embodiment, the cover can also be a clear fluid. Examples of sample processing systems that can be used with the disclosed system and method are also described in U.S. Patent Application Publication No. 2015/0323776, and commonly-assigned U.S. Pat. No. 8,883,509, entitled "Apparatus and Method for Biological Sample Processing" and granted on Nov. 11, 2014, the specifications of which are incorporated herein by reference.

Proper camera and lighting of the imaging system helps ensure quality images of the substrate and cover for image analysis, volume calculation, and fluid volume sensing. It is desirable to have sufficient resolution (or distance per pixel) and good contrast to capture the fluid edge and the specimen in the image. In an exemplary embodiment, a 1600×1200 pixel (2 megapixel or 2 MP) camera may be used. In another embodiment, the camera may have a 35 mm fixed focal length lens with a field of view (FOV) around 988×740 mm and about 61.25 µm/pixel resolution. However, in other embodiments, the camera can have greater than or less than 2 megapixels, a fixed focal length lens that is greater than or less than 35 mm, a field of view that is greater than or less than 988×740 mm, and/or a resolution that is greater than or less than about 61.25 µm/pixel. In still another embodiment, the camera can have a pixel scale (or resolution) of 0.16 mm or lower. In a further embodiment, the camera can use a 50 mm fixed focal length lens with a smaller FOV but a higher resolution. In an exemplary embodiment, a 35 mm fixed focal length lens can be used when imaging at least 3 slides simultaneously. If there are more slides to be imaged, the size of the pixel array may be increased and the focal length of the lens may be decreased so that image quality is uncompromised.

In some embodiments, a frame rate can depend on the speed of the moving fluid across the field of view. For example, assuming that the field of view is 100 mm/wide and the maximal speed of the fluid is 40 mm/s, about 60 frames per second (fps) yields around 8 pixels of a blur across 1200 pixels, which may be used for image analysis.

In some embodiments, the camera can be placed at a predetermined distance (128) above the substrate such that the substrate is within the FOV of the camera. In one embodiment, the camera can be an area scan camera with a global shutter to prevent the distortion of the moving object, i.e., the reagent and/or stain. The global shutter is preferable over a rolling shutter, which will distort the droplet area as it sweeps the pixels along each row in the image. However, other types of cameras can be used in other embodiments.

The predetermined distance for placement of the camera above the substrate may depend on the resolution of the camera and the number of substrates to be captured in the FOV of the camera. In one embodiment, the predetermined distance can be about 15-20 inches (between about 38.1 cm to about 50.8 cm). For instance, the predetermined distance may be 19.5 inches (49.53 cm) to capture three substrates. However, other predetermined distances can be used in other embodiments. In another embodiment, if more than three substrates are to be captured, a camera can use a pixel array with an increased size and a lens with a decreased focal length to maintain the same image quality. In other embodiments, the camera can have higher resolution, i.e., a lower distance per pixel, and a lens with a smaller field of view to capture images of the substrate in more detail.

In some embodiments, the reagent fluid boundaries (107) are illuminated so that it can be easily differentiated from the background, even when the tissue sample has a color. In order to brighten the fluid boundaries (107), two light sources may be used; one light (120) positioned at or near the back and the other light (110) positioned at or near the front of the tissue slide (102). In some embodiments, the front light may be an LED light, and the back light may be another LED light. In some embodiments, the light sources can each generate white light that is used to illuminate the substrate. In some embodiments, the front light source (110) and/or the back light source (120) can be assembled into a lamp for use with a lighting fixture. As an example, the light source may be implemented by an incandescent bulb, a light emitting diode (LED), or a fluorescent light. Yet other types of light sources and types of light are possible in other embodiments. As shown in the embodiment of FIG. 1, the front light source (110) can be positioned in the field of view of the camera and direct light (111) toward one side of the substrate, while the back light source (121) can be positioned outside of the field of view of the camera and direct a second light (121) toward the opposite side of the substrate. In other embodiments, one or both of the front light source and the back light source can be either within or outside of the field of view of the camera.

In alternative embodiments, the imaging schematic may be used for monitoring assay processes. Cameras with higher resolution and a lens with smaller field of view can be used to image the tissue area with better details. Advantageously, the front light source and the back light source can be positioned about the substrate to provide uniform illumination to the substrates so that the result will not be biased or skewed by lighting.

In one embodiment, the back light source (120) can be placed outside of the field of view of camera to provide dark field imaging to make the fluid boundary (107) or edge in the fluid bright, so the fluid edge or boundary (107) has strong contrast to the dark and normal background. In addition, by using dark field imaging, several other issues such as interference from shadows or the pipette blocking a light source can also be resolved. In an alternative embodiment, bright field imaging can be used by the imaging system by placing the front light source (110) in the field of view of the camera (125).

Figure 2:
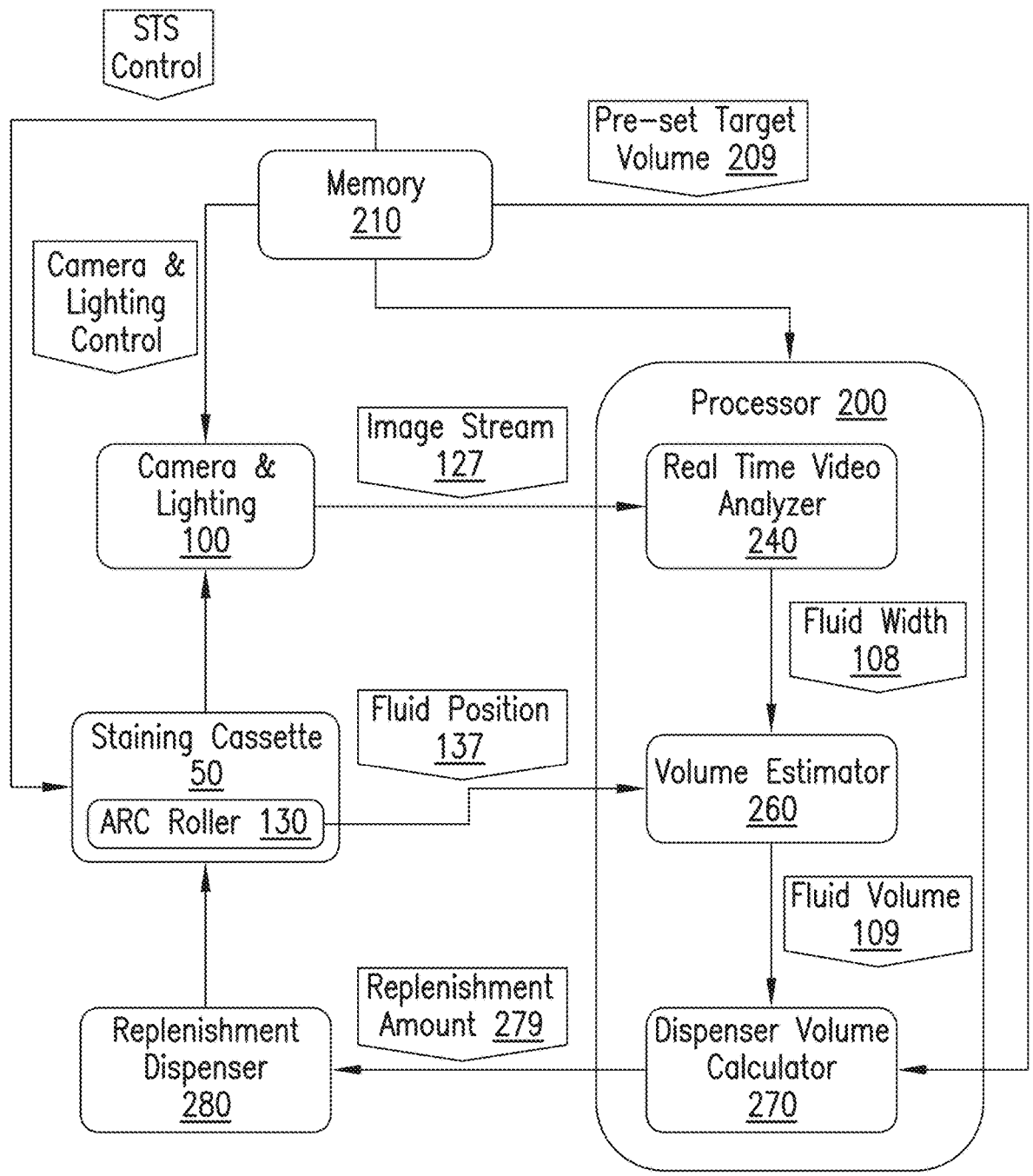
FIG. 2 shows a block diagram of the real-time replenishment system (RTRS) according to a disclosed embodiment.

In another embodiment as shown in FIG. 2, the disclosed system is configured to provide a real time replenishment system (RTRS) to track the fluid volume (109) in the space between the substrate and the cover and determine an amount of fluid (279) to be added to or removed from the sample, if any, by the fluid exchange system (280). The RTRS can use the imaging system (100), an image analyzer (240), a volume estimator (260), a dispenser volume calculator (270), the fluid exchange system (280) and a position signal (137) from fluid motion mechanism, for example, the staining cassette (50) and the fluid rolling cover, or ARC roller, (130).

As further shown in FIG. 2, the real-time replenishment system (RTRS) comprises a memory (210), a processor (200), an imaging system (100) comprising camera and lighting, a staining cassette (50), and a replenishment dispenser (280). The imaging system (100) can feed the image information (127) of the substrate into the processor (200). When the staining cassette (50) transmits a signal (137) to the processor of the time to take a measurement, the processor (200) would perform frame checking and suggest a replenishment amount (279) from the dispenser volume calculator (270) to the staining cassette (50), forming a feedback control loop. As an example, a MATLAB program can output a suggested value to a user interface in real time to demonstrate the feedback concept. In another embodiment, the replenishment amount (279) from dispenser volume calculator (270) can be provided to a user interface and a user can then control the fluid exchange system (280) to provide the reagent and/or stain to the sample. Alternatively, the feedback control loop can automatically direct replenishment dispenser (280) to deliver the replenishment amount (279) to staining cassette (50).

The processor (200) may be operatively connected to the camera (125) to receive acquired or captured images (127) from the camera. The processor may also be operatively connected to a digital I/O device associated with the fluid motion mechanism to receive a digital signal indicative of the position of the fluid (137) in the staining cassette (50). In one embodiment, the images from the camera can be captured at the same fluid position and then analyzed for consistent results. In another embodiment, the image analysis can be performed on either color or gray scale images.

Figure 5:
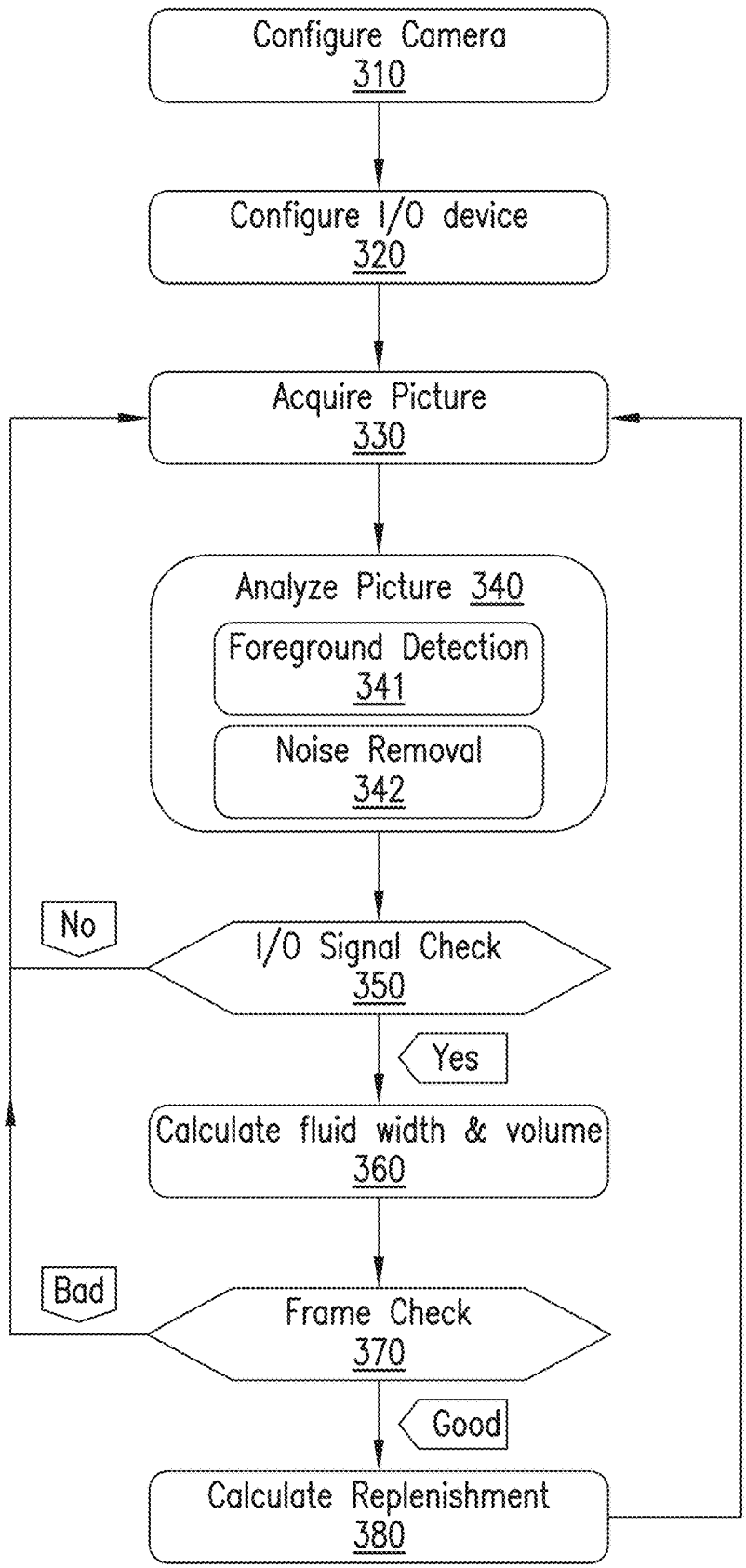
FIG. 5 shows an exemplary process for foreground detection according to a disclosed embodiment.
Figure 6A:
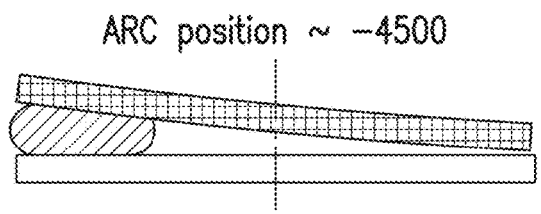
FIG. 6A shows a schematic of a particular combination of ARC and fluid positions.
Figure 6B:
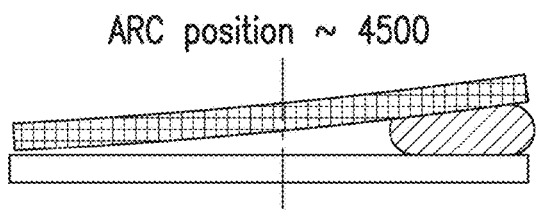
FIG. 6B shows a schematic of another particular combination of ARC and fluid positions.
Figure 6C:
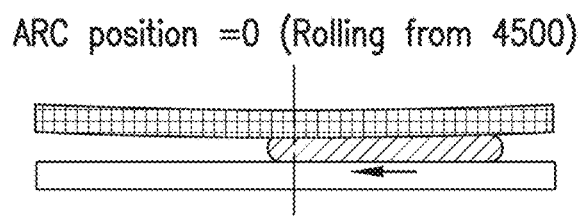
FIG. 6C shows a schematic of another particular combination of ARC and fluid positions.
Figure 6D:
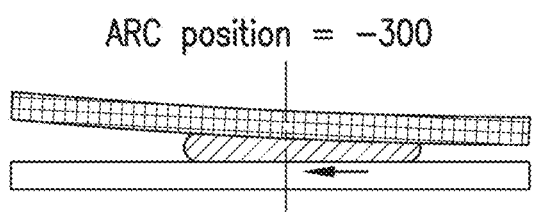
FIG. 6D shows a schematic of another particular combination of ARC and fluid positions.

In some embodiments, the memory (210) can include instructions that cause the processor (200) to perform the operations illustrated in FIG. 5, comprising estimating a volume (360) to determine the amount of fluid, e.g., reagent and/or stain being used with a sample, analyzing the images (340), and calculating a replenishment volume (380) to determine how much reagent and/or stain to apply to the sample with the fluid exchange system based on information from the estimated volume. The instructions can be implemented in software, hardware, firmware or any combination thereof. For instance, the instructions are implemented in software and stored in the memory. When implemented in software, the instructions can be stored and transported on any non-transitory computer-readable medium for use by or in connection with an instruction execution apparatus that can fetch and execute the instructions.

As an example, the processor may include a central processing unit (CPU) or a digital signal processor (DSP). A local interface, such as a bus, can communicate with the processor. Furthermore, an input interface, such as a keypad, keyboard or a mouse, can be used to input data from a user, and an output interface, such as a printer, monitor, liquid crystal display (LCD), or other display apparatus, can be used to output data to the user. Further, a communication interface may be used to exchange data over one or more networks with the front light source, the back light source, the camera, the fluid motion mechanism and the fluid exchange system.

Boundary detection methodologies used by the RTRS can use a distinct feature of the fluid (target) for boundary detection (341). In particular embodiments, a motion-based foreground detection may be used to detect the boundary of clear fluid, and a color-thresholding detection may be used to detect the boundary of a colored fluid. Robustness of these methods enables them to work in various conditions such as changing tissue color, the existence of random tissue patterns, etc.

Figure 3A:
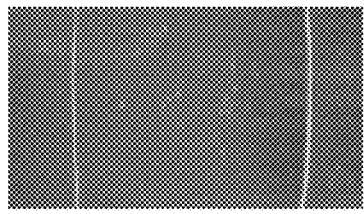
FIG. 3A shows a captured image of a clear fluid.
Figure 3C:
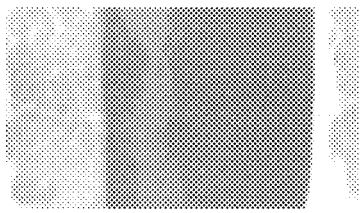
FIG. 3C shows a captured image of a colored fluid.
Figure 3E:
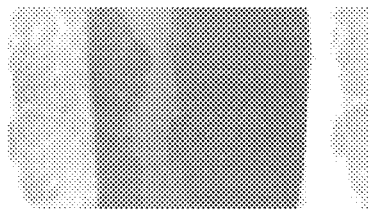
FIG. 3E shows a captured image of a colored fluid.
Figure 3B:
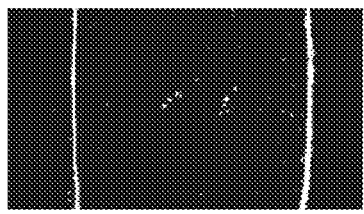
FIG. 3B shows the image of FIG. 3A after foreground detection.
Figure 3D:
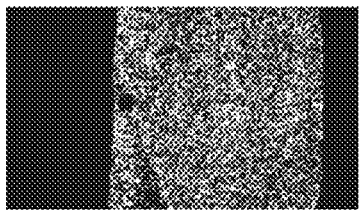
FIG. 3D shows the image of FIG. 3B after foreground detection and color-thresholding.
Figure 3F:
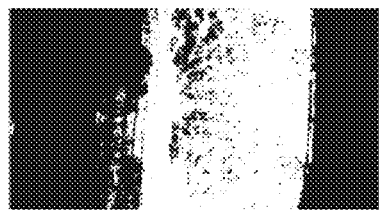
FIG. 3F shows the image of FIG. 3E after foreground detection without color-thresholding.

In some embodiments, the most distinct feature of the target is used for detection. For instance, motion is the most distinct feature of a clear fluid since it is the only part moving, relative to the slide, in the field of view. Algorithms can be adapted to detect boundaries of the clear fluid on a slide. For example, a Gaussian Mixture Model foreground-detection maybe used. In the Gaussian mixture model foreground detection algorithm, two boundaries of the fluid droplet located on the right and left of the droplet can be extracted to calculate the fluid volume. Parameters for the model were chosen empirically, and testing has produced reliable results, as evidenced by FIGS. 3A and 3B. FIG. 3A shows a captured image of a clear fluid, and FIG. 3B shows said captured image of FIG. 3A after foreground detection. Although a motion-based foreground detection method is preferred for identifying clear fluid edged, the detection of colored reagents, such as HTX, using this method has proven to be problematic, as shown in FIGS. 3E and 3F. FIG. 3E shows a captured image with a colored reagent, and FIG. 3F shows said captured image of FIG. 3E after foreground detection. Since the moving area is very large in the field of view, it becomes challenging for the program to identify the background of the frame.

To identify the edge or boundary of a stain or colored reagent, a color-thresholding detection algorithm is preferred for colored reagents due to the distinctive color feature of the fluids. While the tissue may be stained a similar color as the reagent during the staining process, the intensity of the reagent is much stronger; therefore the color-thresholding detection method can differentiate the reagent from the stained tissue. To perform the detection, the images are transferred to a Hue, Saturation, and Value (HSV) color map. An appropriate hue range is chosen to extract a region of the reagent. An example for Hematoxylin is shown in FIGS. 3C and 3D. FIG. 3C shows a captured image with a colored reagent, and FIG. 3D shows said captured image of FIG. 3C after foreground detection. In the color-thresholding foreground detection algorithm, the area of the reagent can be extracted and the fluid volume can be calculated from the extracted area.

In other embodiments where a cover and a substrate are moved relative to one another in an angular fashion (such the systems disclosed in U.S. Pat. Nos. 7,476,543, 8,454,908 and WO2006116039), one boundary of the fluid body may be in a fixed position and only one boundary of the fluid body may need to be monitored to determine a fluid width for use in the disclosed method and system.

Figure 4A:
FIG. 4A shows an example of a type of image frames that should not be used for volume calculation.

Generally, replenishment is most accurate when the volume calculation is determined using a good image with clear fluid boundaries. In the staining process, it is possible to encounter issues that can affect the accuracy of the volume estimation and thereby affect the calculation of the replenishment amount. For example, FIG. 4A shows a resulting foreground detection image for a frame with a pipette arm travelling through the field of view. This frame can yield excessive calculated volume and should not be used for suggesting replenishment. To overcome this issue, the ratio of the bright pixels in the frame is calculated as part of a frame check to ensure that replenishment will not be suggested when excessively bright pixels are present in more than about 50% of the frame relative to normally expected or "dark" pixels. In other words, an acceptable frame has less than 50% of excessively bright pixels relative to normally expected "dark" pixels in the frame. Normally expected or "dark" pixels are pixels that would correspond to pixel intensities of a sample undergoing an analysis when there is no interference from an object such as a pipette arm is moving through the frame when the image is captured.

Figure 4B:
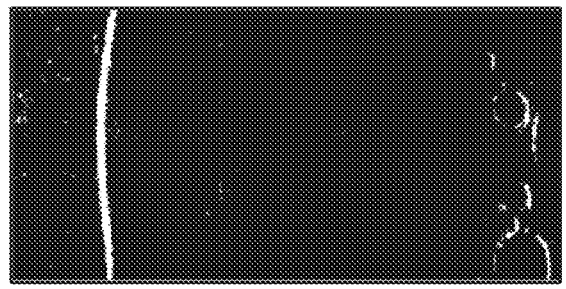
FIG. 4B shows another example of a type of image frames that should not be used for volume calculation.

In another embodiment, an accurate volume calculation cannot occur when one part of the fluid boundary is not in the field of view. FIG. 4B is an example of a resulting foreground detection image when a portion of the fluid boundary is not in the field of view. For example, the fluid boundary may be out of range, i.e., not in the field of view when a large volume (200 µL or more) rolls at higher speeds (greater than 100 mm/s). In a further embodiment, an accurate volume calculation cannot occur when the foreground analysis cannot yield a correct fluid boundary. In these cases, the RTRS can compare a previous volume to a current volume. If there is a large difference between the two volumes, the system can use the subsequent measurement point to determine the current volume. In other words, when there is a large difference between two calculated volumes, the frame check (370) can reject the volume measurement and return the process to acquire a new image.

Referring to FIG. 5, the RTRS process connects the camera and digital input/output (I/O) device to acquire images and SPS digital signal output. With the image and signal, the RTRS program performs image analysis, error checking, and volume calculation to suggest a proper replenishment volume. At the start of the process, the camera and I/O device set-up is initiated (310, 320). Camera parameters such as exposure, brightness, and gain are set in this step. After the camera and the I/O device have been configured, the process goes into a loop of image acquisition from the camera (330), and analysis of the acquired image (340). A foreground detection algorithm can be applied to the captured image by the image analyzer to identify fluid boundaries (341). In one embodiment, the image analyzer can be continuously provided with images or video in order to identify the image background by machine learning. The image analyzer can remove any noise from the processed image (342). Volume calculation can be done when I/O device receives a signal indicating the proper ARC position, i.e. the proper cover position, to make a fluid measurement (350). If the proper I/O signal has not been received, the process will acquire another image.

In one embodiment, the volume of the reagent and/or stain can be calculated (360) based on the system (or "ARC") geometry and the measured fluid width (108), i.e., the distance between the detected fluid boundaries. In one embodiment, the calculated volume may have to be calibrated to account for assumptions used in the volume calculation and/or other possible matters that may affect the accuracy of the calculation. A frame check (370) is then performed to determine if the frame and corresponding volume calculation are acceptable. The frame check allows for error checking by removing frames with excessive volume change and other abnormal frame conditions, such as pipette blocking of the FOV. If the frame check identifies a bad frame, i.e. there is an error or abnormality associated with the frame, the process returns to the image acquisition. If the volume calculation is not acceptable, i.e., there is an error or abnormality associated with the volume calculation, the process returns to acquire another image. Otherwise, a replenishment amount is calculated (380) by the dispenser volume calculator, and the next loop begins to acquire another image.

In some embodiments, the ARC positions may be acquired for every frame to identify a measurement point. The ARC position is determined by the step motor positions. As shown in FIG. 6, step motor positions are around +4500 and −4500 from the center when the fluid is around the edge of the slide. Ideally, the measurement should be taken at the center of the slide, implying an ARC position of 0 is the optimal measurement point. However, in some embodiments, the fluid is dragging behind the ARC during the motion, therefore the ARC position around −300 should be taken as the measurement point if the ARC position is coming from +4500. Since the RTRS can check ARC position periodically, the SPS is adjusted to signal 1 if the ARC position is between −300 and +4500 and signal 0 in other positions. Thus, the signal is recorded, and if the previous signal equals to 1 and current signal turns to 0, then the ARC position is moving from +4500 and crossing −300, which is the measurement point that signals the RTRS to execute volume calculation and frame check.

As shown in FIG. 6, a cover position, as provided by the I/O signal, can be acquired each time an image or frame is acquired to identify the position of the reagent and/or stain in the space between the substrate and the cover. Cover position can be determined by the step motor positions in the fluid motion mechanism that move the cover and thereby move the reagent and/or stain over the sample. In one embodiment, the step motor positions and corresponding cover positions can be around +4500, which indicates one end position corresponding to the reagent and/or stain at the right end of the slide (see FIG. 6B), and −4500, which indicates another end position corresponding to the reagent and/or stain at the left end of the slide (see FIG. 6A), from a center position. The proper cover position for taking a measurement can be when the reagent and/or stain is located at the center of the slide. FIG. 6C shows the reagent and/or stain at cover position 0, which corresponds to the center position when the reagent and/or stain is moving from right to left in FIG. 6C, in which the cover position does not correspond to the reagent and/or stain being in the center of the slide. Since the reagent and/or stain is moving in the space between the cover and the substrate, the proper cover position would be at a predetermined location relative to the center of the substrate (which corresponds to cover position 0) depending on the direction of travel and the viscosity of the reagent and/or stain. In another embodiment as shown in FIG. 6D, the reagent and/or stain is at the measurement point, i.e., the reagent and/or stain is in the center of the slide, at cover position −300, when the reagent and/or stain is moving from right to left in the space between the cover and the substrate. The embodiments shown in FIGS. 6A-6D are schematic representations used to show the position of the reagent and/or stain relative to cover position and are not intended to provide any details on the relative sizes of the components.

In one embodiment, the RTRS can check cover position periodically. A detection mechanism in the fluid motion mechanism, which generates the I/O signal, can determine if the cover position passes cover position −300 when moving from cover position +4500. The detection mechanism can adjust the I/O signal to a "1" if the cover position is between −300 and +4500 and adjust the I/O signal to a "0" in other positions. The RTRS can record or store the I/O signal, and if the previous I/O signal equals to 1 and the current I/O signal changes to 0, then this would indicate that the reagent and/or stain is moving from an cover position of +4500 and just crossed a cover position of −300, which corresponds to the reagent and/or stain being in the proper position for a measurement. In another embodiment, the detection mechanism can send a signal that corresponds to the cover position and the RTRS can evaluate the signal from the detection mechanism to determine whether the corresponding cover position from the signal is within a predetermined range of the predetermined location of the cover position. For example, the RTRS can indicate a positive I/O signal if the cover position is between about −200 and −400 when the reagent and/or stain is moving from right to left in the space between the cover and the substrate.

Figure 7A:
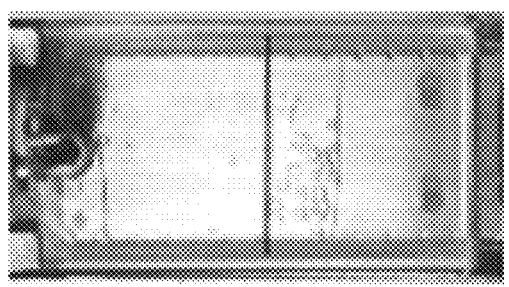
FIG. 7A shows image of an ARC position vs. fluid position.
Figure 7C:
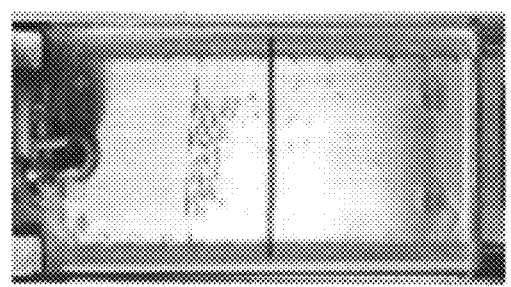
FIG. 7C shows another image of an ARC position vs. fluid position.
Figure 7B:
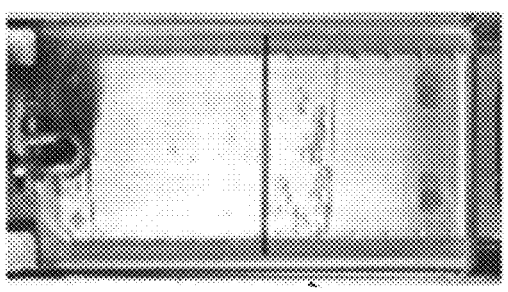
FIG. 7B shows another image of an ARC position vs. fluid position.
Figure 7D:
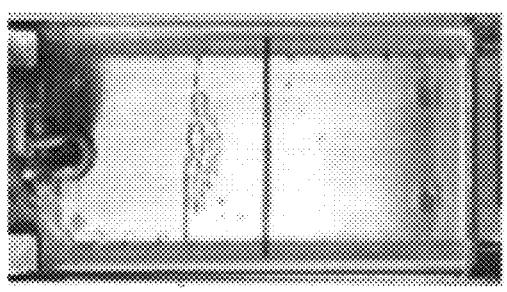
FIG. 7D shows another image of an ARC position vs. fluid position.

As described above, the reagent and/or stain can be dragging behind the center of the cover position, so the measurement should be taken slightly away from the central point of the substrate position. For example, when acquiring images at the central point (138) of the fluid motion mechanism, the majority of the reagent and/or stain can be on the left-hand side of the central point when the reagent and/or stain is travelling to the right and the majority of the reagent and/or stain can be on the right-hand side of the central point (138) when the reagent and/or stain is travelling to the left. As shown in FIG. 7, when the central point (138) of the ARC is marked by the black line, different fluid positions can be observed while the pictures are acquired at the central point of ARC movement. It can be found that in FIGS. 7A and 7B, the majority of the fluid body is on the left-hand side of the central point (138) because the fluid is dragging behind when it travels to the right. Similarly, the same phenomenon can be found when it travels back to the left as shown in FIGS. 7C and 7D.

In some embodiments, the RTRS can be used to characterize the relationship between the motion of the reagent and/or stain and fluid motion mechanism, to understand how reagent and/or stain moves at different rolling speed and reagent volume, and to investigate how different reagents with different viscosities behave during the rolling operation since the RTRS can acquire images at certain cover positions.

In one embodiment, the RTRS can perform image acquisition, cover position acquisition, and image analysis in about 0.06 seconds and would have a frame rate of about 16 frames per second. The processing time can be based on the programming language used to perform the image analysis and the performance of the computer used to execute the image analysis. Improvements in processing time may be obtained by using more efficient programming languages or better performing computers.

Figure 8:
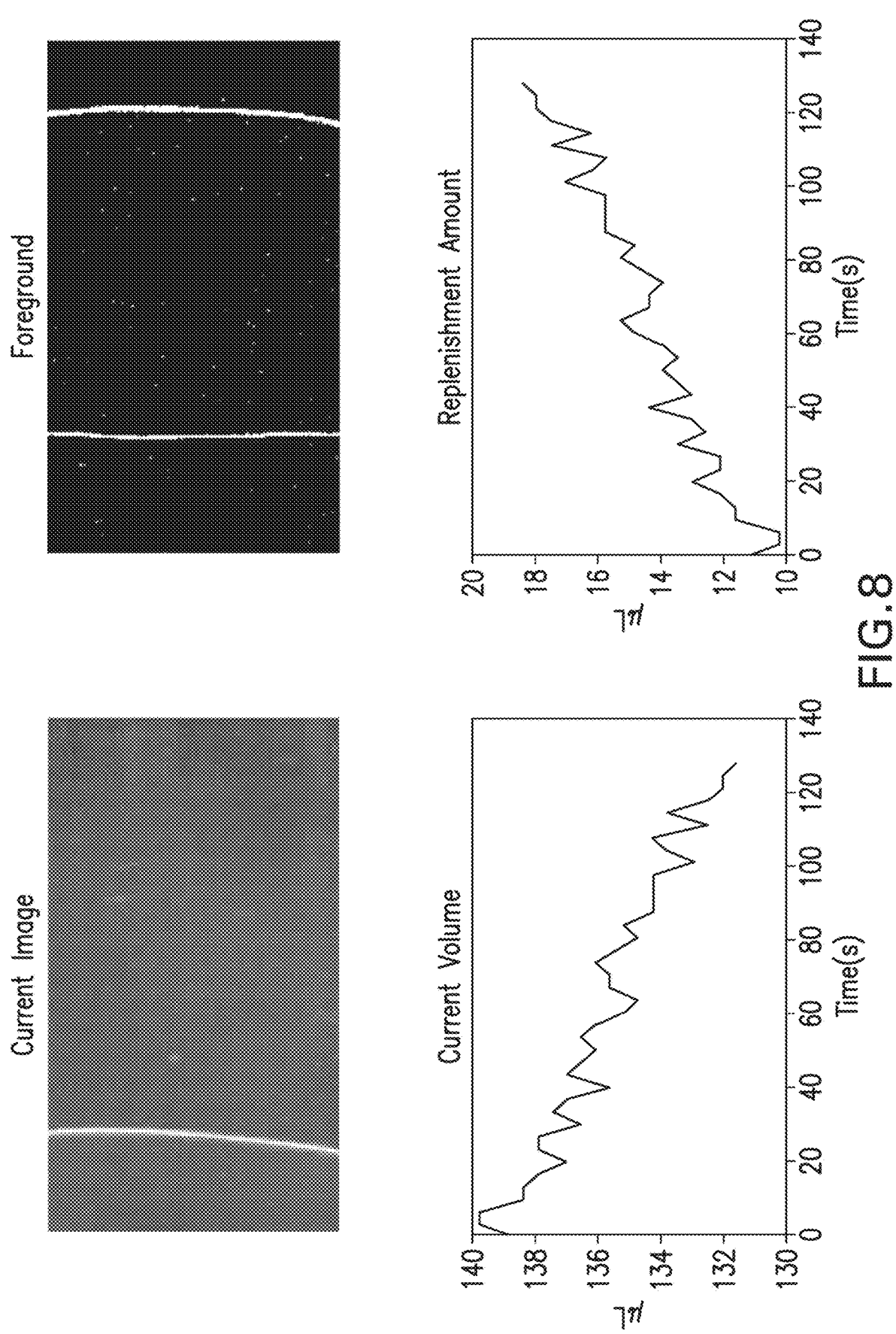
FIG. 8 shows an exemplary screenshot of the RTRS interface after 120 seconds of operation.

As show in an exemplary embodiment of FIG. 8, the interface of RTRS comprises four panels. The top-left panel shows the current image acquired by camera. The top-right panel shows the foreground detected using the Gaussian Mixture Model or color-thresholding method in the case of Hematoxylin. The lower-left panel shows the calculated current volume based on the foreground. A decline of measured volume can be observed. For example, 8 μL of the reagent was evaporated after 120 seconds of rolling. The lower-right panel shows the suggested replenishment based on user-input target volume, offset volume, and the measured volume.

Bubble formation in the fluid area can increase the measured fluid width and cause the RTRS to overestimate the current volume. This phenomenon can occur in reagents such as antibody diluents when used with the cover. Hence there is a need for a method to remove or compensate for the bubbles. In one embodiment, the circular shape of the bubbles inside the fluid can be used to detect for the presence of the bubbles and then perform compensation for the bubbles. A circle detection scheme can be used to identify any bubbles in the detected foreground of the acquired image. An exemplary circle detection scheme may be based on Hough transforms to identify the bubbles in the image. By calculating the numbers of bubbles in the image and determining volume compensations for the bubbles, the volume of the reagent and/or stain can be measured more accurately in the presence of bubbles in the reagent and/or stain.

Figure 9:
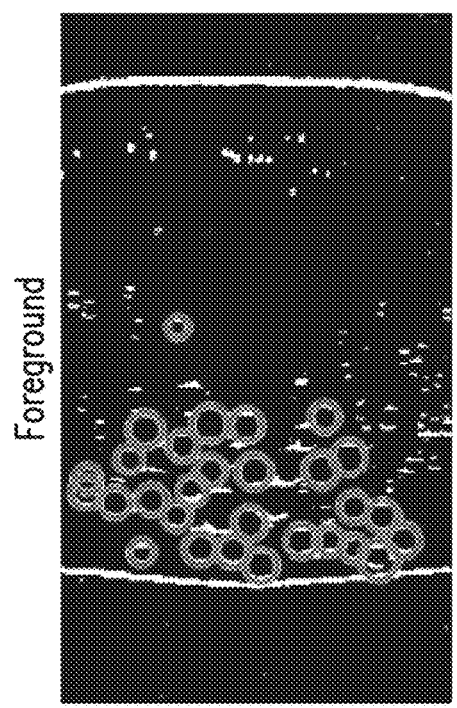
FIG. 9 shows an exemplary screenshot of the RTRS with bubble compensation of the fluid.
Figure 9:
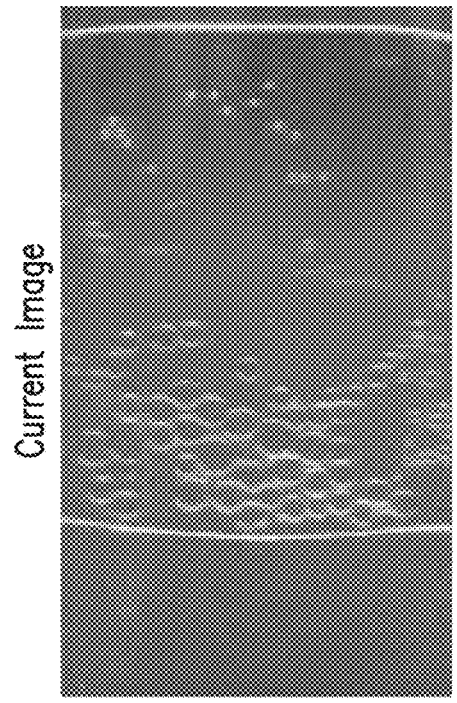
Figure 9:
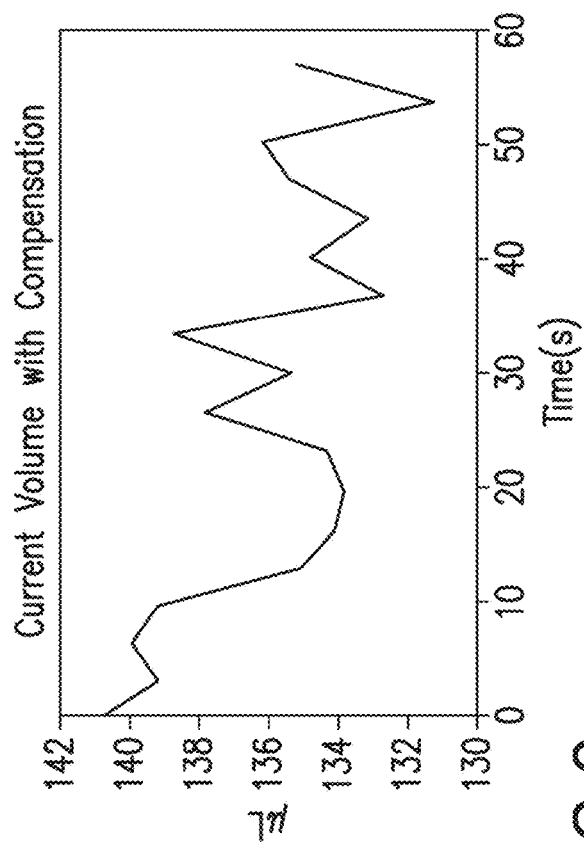
Figure 9:
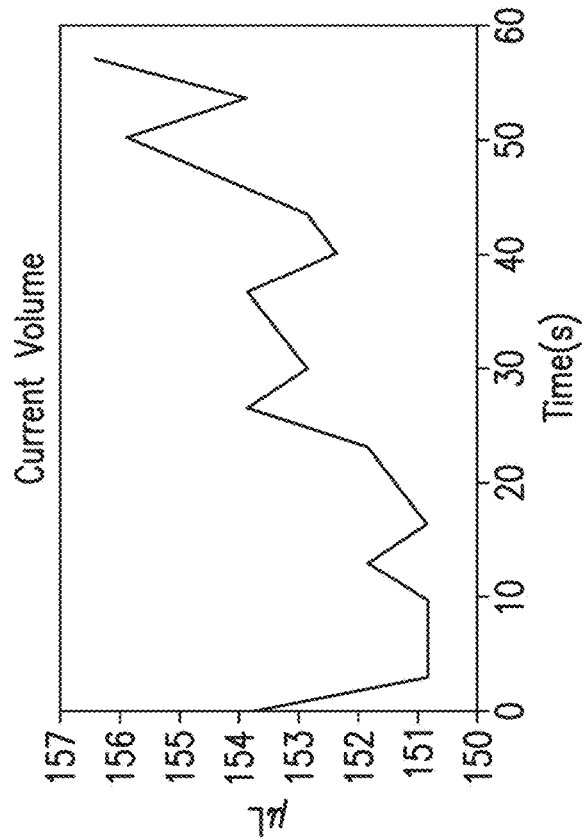

As shown in FIG. 9, the detected bubbles are circled. FIG. 9 further shows a comparison of the measured evaporation rate in a case without bubbles (Current Volume) and with bubble compensation (Current Volume with Compensation). The results show only around 4 μL differences after 1 minute of rolling operation. Without the compensation, the current volume would be calculated as an increase from about 151 μL to about 156 μL; whereas with bubble compensation, the current volume is calculated to be a decrease from 141 μL to 134 μL. The bubble compensation follows a similar trend of the Current Volume in FIG. 8, which shows a loss of volume due to evaporation, as expected.

Figure 10:
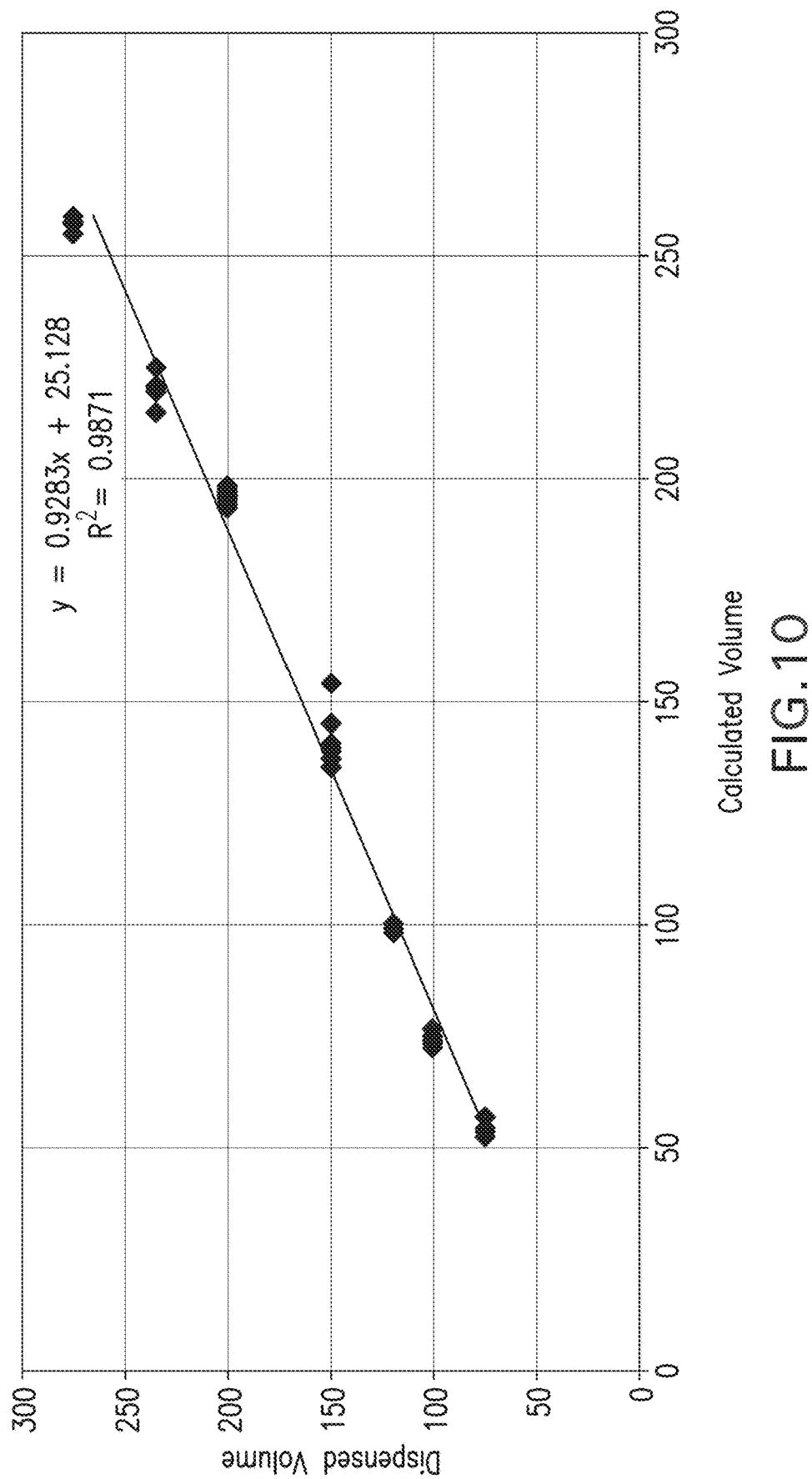
FIG. 10 demonstrates the close correspondence between calculated and known volumes according to an illustrative embodiment.

Some embodiments use a volume calculation method that provides a first order approximation to estimate the volume based on ARC geometry and measured fluid width. This approach requires a calibration curve for better volume assessment. To derive a calibration curve, different volumes from 70 to 250 μL were manually dispensed and tested in the rolling process at least 5 times at each volume. By plotting the known dispensed volume (209) and the calculated volume (109) in a scattering plot. The calibration curve can be found as shown in FIG. 10 with $R^2=0.9871$. In further embodiments, improved calibration curves can be derived using higher orders of calibration curves.

Example 1

The following is a non-limiting example of the RTRS tested under full load conditions with system interference such as vibration, pipette blocking field of view, etc. A CD-20 staining process on a tonsil sample was performed and recorded. The result was gauged by if the detection system can identify the fluid area/edge reliably and accurately.

Six processes in the staining assays were listed as the representative cases to test RTRS. These six cases represent all the current assay processes performed with the ARC system that requires replenishment. For each case, target volume will be dispensed manually by pipette for 10 times and the first 5 data points will be taken as the measured volume, totaling 50 data points for each case. Only the first 5 points were chosen because evaporation starts to come into effect after 5 data points. After collecting 50 data points for each case, average and standard deviation based on a population were calculated to evaluate the performance. The raw data were also plotted with box plot to show the distribution of the measurement values.

Figure 11A:
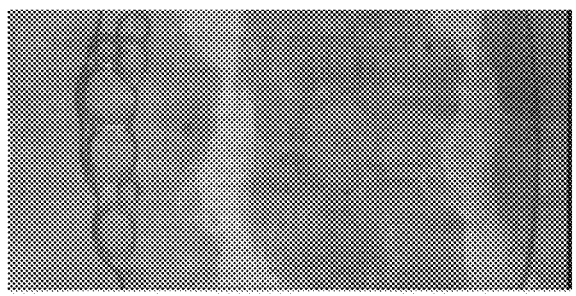
FIG. 11A shows a non-limiting example of edge detection with changing tissue color and vibration in bright field.
Figure 11B:
FIG. 11B shows the image of FIG. 11A in dark field.
Figure 11C:
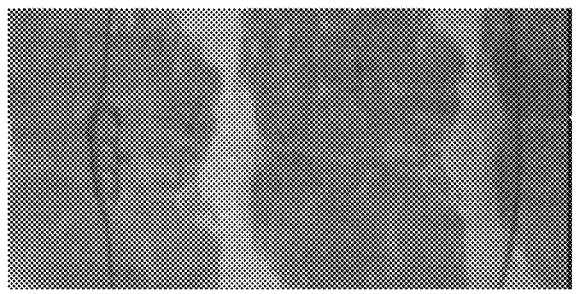
FIG. 11C shows another non-limiting example of edge detection with changing tissue color and vibration in bright field and dark field.
Figure 11D:
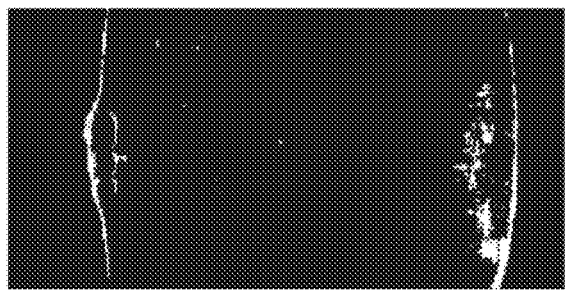
FIG. 11D shows the image of FIG. 11C in dark field.

A full loaded CD-20 staining process on tonsil samples was recorded and used to test the foreground detection. It was found that foreground detection is resistant to camera vibration and changing tissue color as shown in FIG. 11. For example, FIG. 11B shows that the tissue is changing color, i.e. becoming more stained, from that of FIG. 11A. The fluid edge in bright field imaging was difficult to observe when the tissue becomes darker color because the fluid edge would blend into the tissue background. This issue was resolved by using dark field imaging to make the edge bright, so it has strong contrast to dark and normal background. By changing the imaging method, several other issues such as the interference by the shadow of other ARC systems and pipette blocking the light source are also resolved. The pipette movement was also observed to block the field of view and this is an inevitable process during the assay. Thus, instead of preventing it from happening, an additional function was added to frame check program to see if there are excessive bright pixel in the field of view since that often indicates big object entering the frame.

Figure 12:
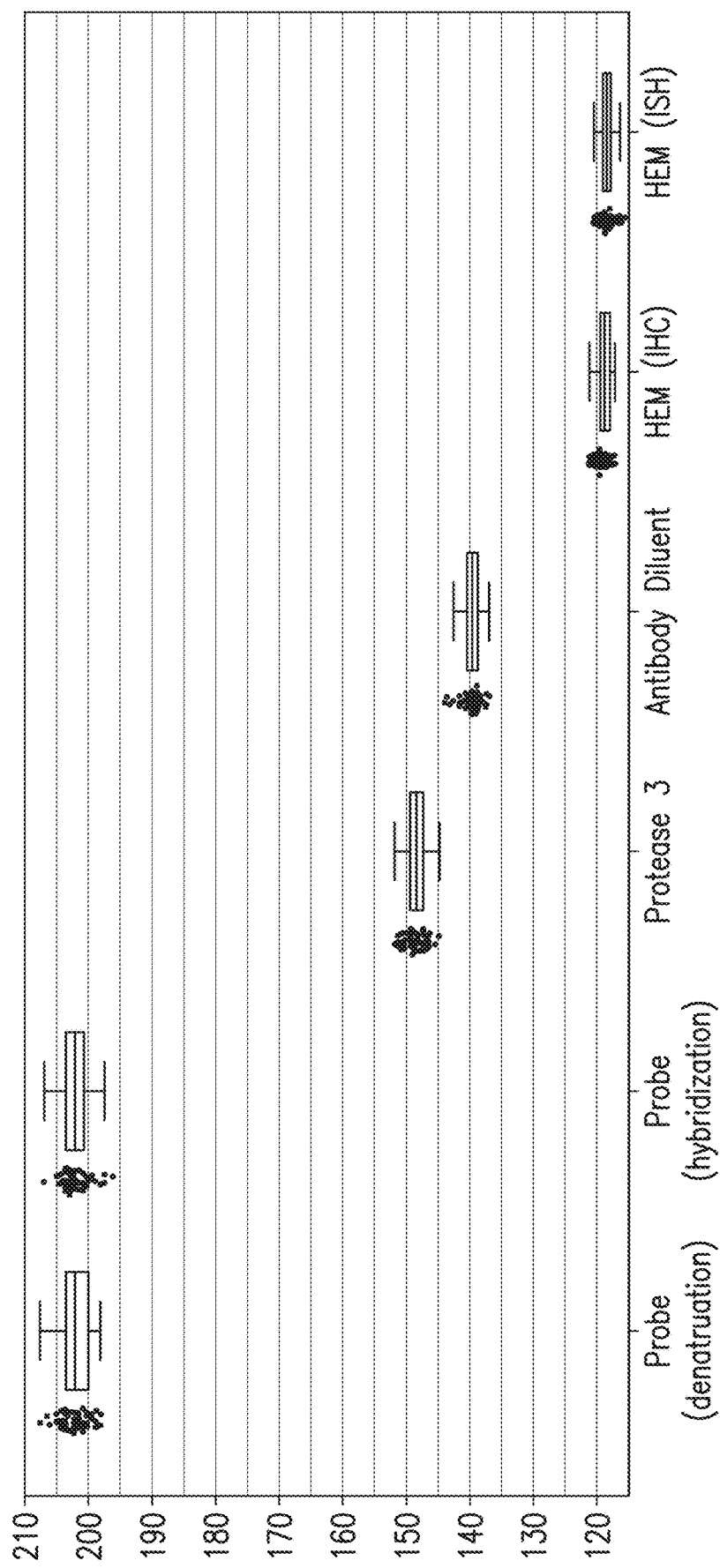
FIG. 12 shows non-limiting examples of measured volume for various reagents.

As shown in Table 1 below, the measured volume matches the target volume with ±1.5% standard deviation. With this percentage converted back to microliters, the performance satisfies translates to ±10 μL. The distribution of the measured volume can be found in FIG. 12. The assay with target volume around 200 μL yields the wider spread of the data. Since different reagents have different viscosity, it was also found that a variety of ARC position range should be used for different reagents. The position range in the table indicates the best range to capture the fluid area in the middle of the region of interest. Finally, a calibration curve was derived to describe the trend between calculated volume and real volume. Various calibration constants were used to minimize the error around each target volume.

TABLE 1

| | Representative case conditions and measurement results | | | | | |
|---|---|---|---|---|---|---|
| | Probe (hybridization) | Probe (denaturation) | Protease 3 | Antibody Diluent | HEM (IHC) | HEM (ISH) |
| Target Volume (μL) | 200 | 200 | 150 | 140 | 120 | 120 |
| Measured Volume (μL) | 201.96 ± 2.09 | 202.10 ± 2.17 | 148.58 ± 1.63 | 139.76 ± 1.52 | 119.09 ± 1.05 | 118.37 ± 1.11 |
| Rolling speed (mm/s) | 40 | 50 | 50 | 50 | 40 | 40 |

TABLE 1-continued

Representative case conditions and measurement results

|  | Probe (hybridization) | Probe (denaturation) | Protease 3 | Antibody Diluent | HEM (IHC) | HEM (ISH) |
|---|---|---|---|---|---|---|
| Tissue Condition | Clear | Clear | Clear | Clear | Brown (stained) | Brown (stained) |
| ARC position 1 | 0 | 0 | −300 | −300 | −75 | −100 |
| ARC position 2 | 5000 | 5000 | 5000 | 5000 | 5000 | 5000 |
| Calibration Constant | 13.128 | 13.128 | 25.128 | 28.128 | 31.128 | 31.128 |
| Reagent 1 | Probe | Probe | Protease 3 | Diluent | HEM | HEM |
| Volume (µL) | 200 | 200 | 25 | 100 | 40 | 60 |
| Reagent 2 | N/A | N/A | Apollo Wash | RB | RB | RB |
| Volume (µL) | N/A | N/A | 125 | 40 | 80 | 60 |

Figure 13A:
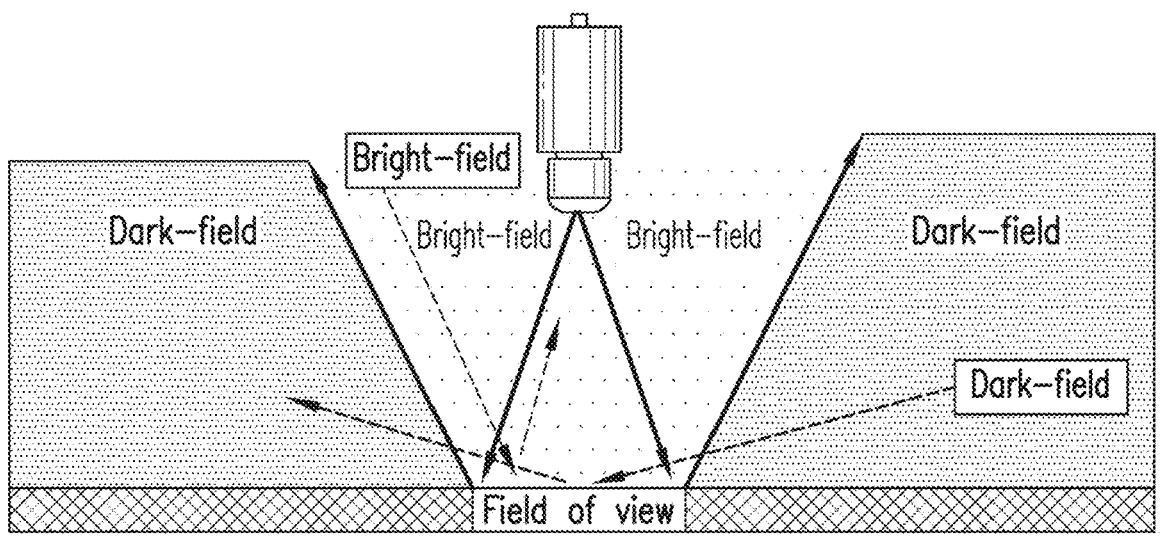
FIG. 13A shows a dark field and bright field imaging arrangement.
Figure 13B:
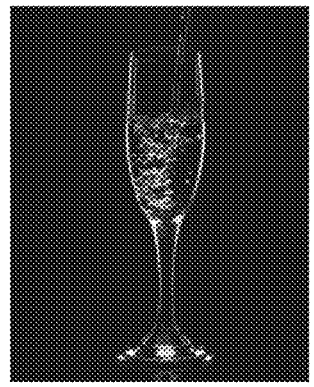
FIG. 13B shows a non-limiting example of dark-field imaging emphasizing an object's edge.
Figure 14A:
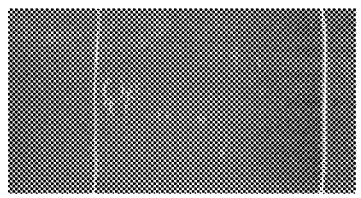
FIG. 14A shows a dark-field image.
Figure 14C:
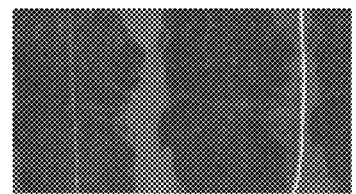
FIG. 14C shows a dark-field image
Figure 14E:
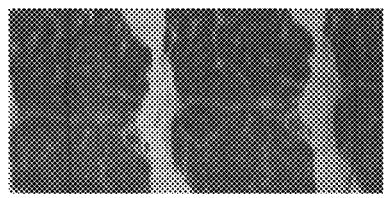
FIG. 14E shows a bright-field image of a stained specimen
Figure 14B:
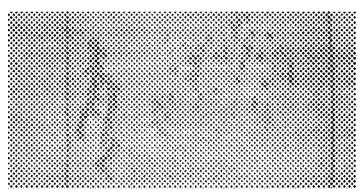
FIG. 14B shows a bright-field image.
Figure 14D:
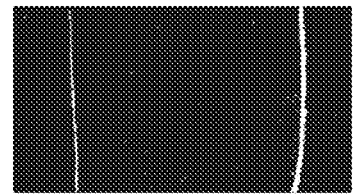
FIG. 14D shows a dark-field image.
Figure 14F:
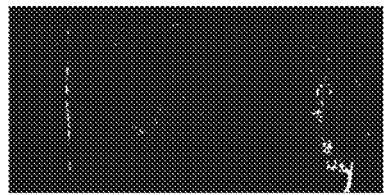
FIG. 14F shows a dark-field image.

As previously mentioned, dark-field imaging allows for the edge of the object to be illuminate for detection. FIG. 13A shows the relationship between lighting angle and the camera location, and FIG. 13B shows an object with brightened edges from dark-field imaging. A comparison of the clear fluid pictures acquired by dark-field imaging and bright-field imaging can be found in FIG. 14. Although bright-field imaging provides quality images for analysis (FIGS. 14A and 14B), the darkness of the fluid boundary poses a challenge during analysis when the specimen becomes stained (FIGS. 14E and 14F). Hence, in some disclosed embodiments, dark-field imaging is utilized for the RTRS (FIGS. 14C and 14D).

Example 2

Several commonly used edge detector algorithms are available for use. These algorithms include Canny, Log, Prewitt, Roberts, Sobel, and Zero Cross. Each edge detector uses its own mathematical model to identify the edge in the frame. The frames shown in FIG. 15 are used as examples for edge detection using said detection algorithms.

Edge detection using Hough line detection was not found to be an ideal approach since the RTRS encounter different tissue backgrounds and imaging conditions. The tissue pattern can deteriorate the fluid edge detection once stained. Also, different edge detection methods can have different sensitivities. For instance, a weak sensing method can miss one side of the boundary and a strong sensing method can detect too many random edges in the background, making fluid boundaries difficult to identify.

Figure 15A:
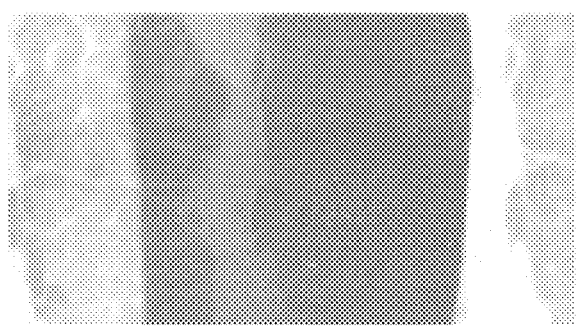
FIG. 15A shows an example of a frame of an image of a tissue sample used for edge detection.
Figure 15B:
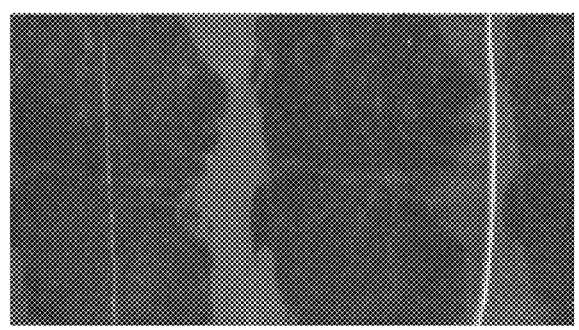
FIG. 15B shows another example of a frame of an image of a tissue sample used for edge detection.
Figure 16:
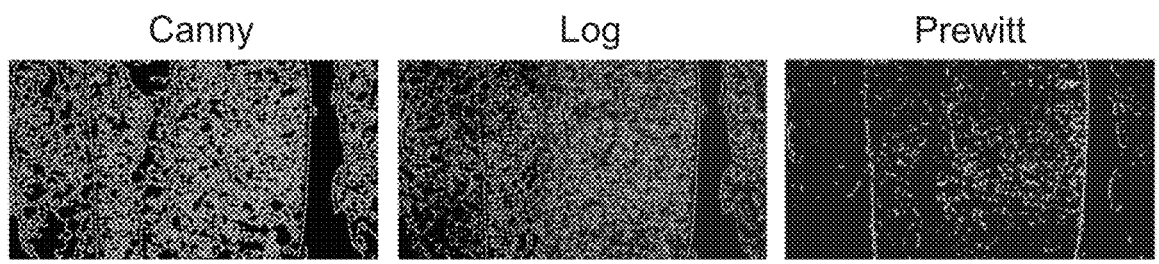
FIG. 16 shows edge detection of FIG. 15A using various algorithms.
Figure 16:
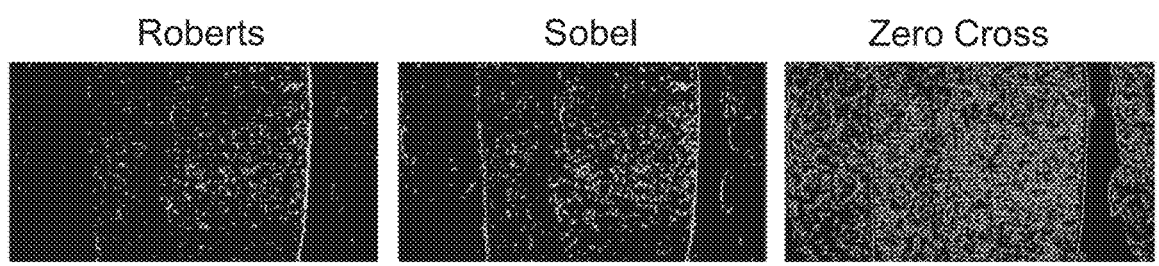
Figure 17:
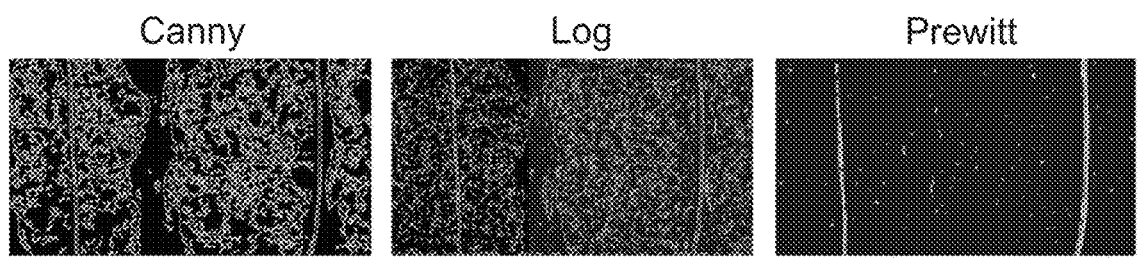
FIG. 17 shows edge detection of FIG. 15B using various algorithms.
Figure 17:
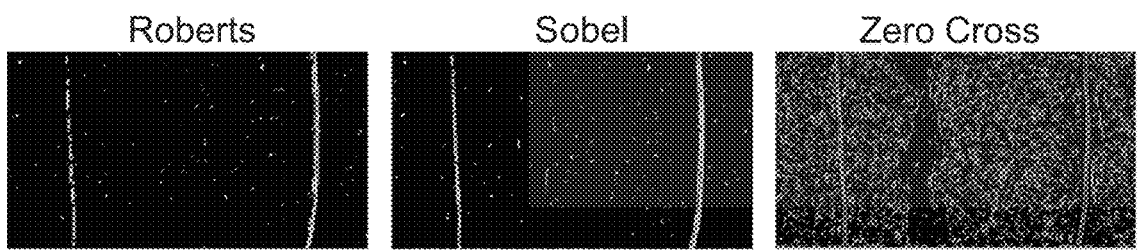

Edge detection of FIG. 15A using various algorithms is shown in FIG. 16. The Sobel and Prewitt detectors are able to plot the edge of Hematoxylin. However, the boundary of stained tissue can be observed as well. This may affect the yield to identify the edge. A strong detector can plot excessive noise, as shown in the case of Canny, Log, and Zero Cross. A weak detector can miss the edge of the fluid. Edge detection of FIG. 15B using various algorithms is shown in FIG. 17. The Sobel and Prewitt detectors are also able to identify the fluid edge. The Robert detector results in a portion of the fluid boundary being unclear. The Canny, Log, and Zero Cross detectors result in excessive noise (or patterns) from the tissue, which would make the edge identification difficult.

Figure 18A:
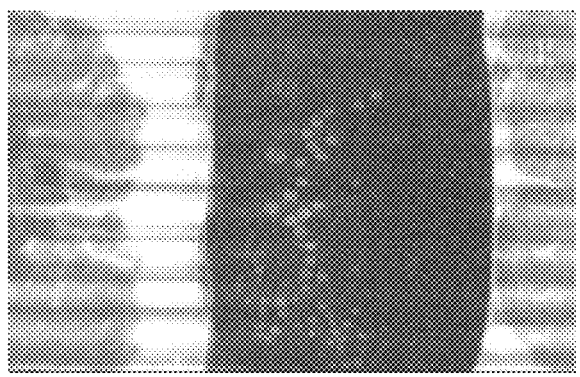
FIG. 18A shows a Hematoxylin-stained tissue over a line-patterned heater in bright field.
Figure 18B:
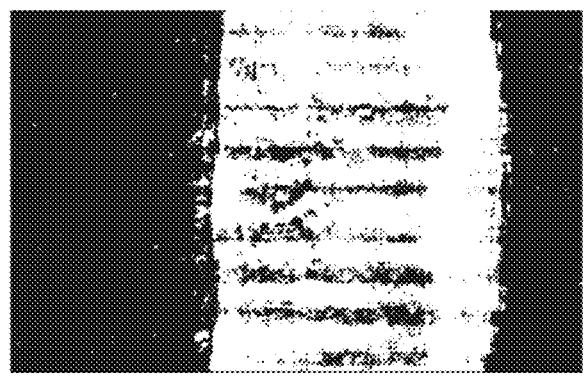
FIG. 18B shows a Hematoxylin-stained tissue over a line-patterned heater in dark field.

It is desirable for the staining system to have a heater that does not produce line patterns, in order to be compatible with the RTRS. Heater with line patterns can compromised performance and affect image processing, as shown in FIG. 18. This issue becomes more pronounced when colored reagents are applied on a stained tissue due to the strong contrast generated by line pattern in the background.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provides one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an Internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the Internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

As used herein, the term "about" refers to plus or minus 10% of the referenced number.

Various modifications, in addition to those embodiments described herein, will be apparent to those skilled in the art from the foregoing description. Such modifications are also intended to fall within the scope of the appended claims. Each reference cited in the present application is incorporated herein by reference in its entirety.

Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions herein using the phrase "comprising" or "including" may also be described as "consisting of", and as such the written description requirement for claiming one or more embodiments using the phrase "consisting of" is met.

REFERENCES

P. Kaewtrakulpong, R. Bowden, "An Improved Adaptive Background Mixture Model for Realtime Tracking with Shadow Detection", In Proc. $2^{nd}$ European Workshop on Advanced Video Based Surveillance Systems, AVBS01, VIDEO BASE SURVEILLANCE SYSTEMS: Compute Vision and Distributed Processing (September 2001).

Stauffer, C. and Grimson, W. E. L., Adaptive Background Mixture Models for Real-Time Tracking, Computer Visions and Pattern Recognition, IEEE Computer Society Conference on, Vol. 2 (5 Aug. 1999), pp. 2246-2252 Vol. 2.

The invention claimed is:

1. A method of estimating a replenishment amount of a fluid to be dispensed onto a substrate holding a biological sample undergoing an assay, the method comprising:
   a. capturing an image of the fluid dispensed on the substrate holding the biological sample with an imaging system to produce a captured image, wherein the fluid is confined to a space between the substrate and a cover;
   b. analyzing the captured image to identify fluid boundaries of the fluid dispensed on the substrate and confined to the space between the substrate and the cover;
   c. calculating a fluid volume of the fluid dispensed on the substrate using a fluid width determined from the fluid boundaries; and,
   d. calculating the replenishment amount of the fluid based on the calculated fluid volume and a predetermined fluid volume.

2. The method of claim 1, further comprising performing a frame check to detect if there is an error or abnormality in the captured image, wherein if the frame check detects an error or abnormality in the captured image, repeatedly capturing images until the captured image passes the frame check or a maximum number of frame check error iterations is reached.

3. The method of claim 1 further comprising, determining a fluid position of the fluid dispensed on the substrate and comparing the fluid position to a predetermined position, wherein the cover is a moving cover that moves the fluid across the substrate, wherein if the fluid position is outside of the predetermined position, repeatedly capturing images until the fluid is moved to the predetermined position by the moving cover; and, if the fluid position is in the predetermined position, calculating the fluid volume.

4. The method of claim 1, wherein the imaging system comprises a camera disposed above the cover and at least two light sources, wherein a first light source is positioned such that a first light emitted from the first light source is within a field of view (FOV) of the camera, and wherein a second light source is positioned such that a second light emitted from the second light source is outside the field of view of the camera to provide an imaging arrangement configured for dark-field imaging.

5. The method of claim 4, wherein dark-field imaging is used to identify the fluid boundaries when analyzing the captured image.

6. The method of claim 1, wherein analyzing the captured image comprises applying foreground detection to the captured image to identify the fluid boundaries.

7. The method of claim 1, wherein the fluid is a clear fluid and motion-based foreground detection is used to identify the fluid boundaries.

8. The method of claim 1, wherein the fluid is a colored fluid and a color-threshold detection is used to identify the fluid boundaries.

9. The method of claim 1, wherein analyzing the captured image further comprises removing noise from a background of the captured image.

10. The method of claim 4, wherein a distance between the camera and the cover is between about 38.1 cm (15 inches) to about 50.8 cm (20 inches).

11. The method of claim 1, wherein calculating the fluid volume comprises comparing the fluid width to a calibration curve to provide the calculated fluid volume, wherein the calibration curve is prepared by plotting known fluid volumes against corresponding fluid widths.

12. The method of claim 11, wherein the calibration curve is a first-order calibration curve.

13. The method of claim 1, wherein calculating the fluid volume further comprises:
   a. detecting bubbles in the dispensed fluid confined to the space between the substrate and the cover by performing circle detection to identify bubbles in the captured image; and
   b. compensating for bubble volume by calculating a number of bubbles and a bubble volume for each bubble, and subtracting a total bubble volume from the calculated volume determined using the fluid width to provide a corrected calculated volume; and
   c. using the corrected calculated volume to calculate the replenishment amount.

14. The method of claim 2, wherein performing the frame check comprises calculating a ratio of bright pixels to dark pixels in the captured image, wherein if the ratio of bright pixels to dark pixels is greater than about 50% in the captured image, the image fails the frame check, and if the ratio of bright pixels to dark pixels is less than about 50% in the captured image, the image passes the frame check.

15. The method of claim 2, wherein performing the frame check comprises comparing the calculated fluid volume to the predetermined fluid volume or at least one previously calculated volume to produce a volume difference, wherein if an absolute value of a ratio of the volume difference and the predetermined fluid volume or the previously calculated volume is greater than a difference calculated using a predetermined evaporation rate of the fluid the image fails the frame check.

16. The method of claim 2, wherein performing the frame check further comprises notifying a user if the maximum number of frame check error iterations is reached.

17. The method of claim 2, wherein the maximum number of frame check error iterations is about five iterations.

18. The method of claim 1, further comprising replenishing the fluid volume by the replenishment amount.

19. The method of claim 3, wherein determining the fluid position comprises determining a position of the moving cover, wherein the position of the moving cover correlates to the fluid position, wherein if the position of the moving cover is outside of a predetermined region, then the fluid position is outside of the predetermined position.

20. The method of claim 19, wherein the moving cover comprises a fluid rolling cover and the predetermined region is off-set from a center line of the fluid rolling cover to compensate for a lag in a movement of the fluid position relative to a position of the fluid rolling cover.

21. The method of claim 20, wherein determining the fluid position further comprises determining a direction of movement of the fluid relative the center line of the fluid rolling cover when the fluid rolling cover is moving the fluid across the substrate.

22. A system for estimating a replenishment amount of a fluid dispensed onto a substrate containing a biological sample undergoing an assay, wherein the fluid is confined to a space between the substrate and a cover; the system comprising:
   a. an image acquisition and storage system comprising:
      i. a camera disposed above the substrate and the cover; and,
      ii. at least two light sources, wherein a first light source is positioned such that a first light emitted from the first light source is within a field of view (FOV) of the camera, and wherein a second light source is positioned such that a second light emitted from the second light source is outside the field of view of the camera, thereby producing an imaging arrangement configured for dark-field imaging;
   b. a processor operatively coupled to the image acquisition and storage system; and
   c. a memory operatively coupled to the processor, configured to store digitally-encoded instructions that, when executed by the processor, cause the processor to perform operations comprising:
      i. capturing an image of the fluid dispensed on the substrate holding the biological sample using the camera to produce a captured image;
      ii. analyzing the captured image to identify fluid boundaries of the fluid dispensed on the substrate and confined to the space between the substrate and the cover;
      iii. calculating a fluid volume of the fluid dispensed on the substrate using a fluid width determined from the fluid boundaries; and,
      iv. calculating the replenishment amount of the fluid based on the calculated fluid volume and a predetermined fluid volume.

23. The system of claim 22, wherein the memory is further configured to store digitally-encoded instructions that, when executed by the processor, cause the processor to perform operations comprising performing a frame check to detect if there is an error or abnormality in the captured image, wherein if the frame check detects an error or abnormality in the captured image, repeatedly capturing images until the captured image passes the frame check or a maximum number of frame check error iterations is reached.

24. The system of claim 22, wherein the memory is further configured to store digitally-encoded instructions that, when executed by the processor, cause the processor to perform operations comprising, determining a fluid position of the fluid dispensed on the substrate and comparing the fluid position to a predetermined position, wherein the cover is a moving cover that moves the fluid across the substrate, wherein if the fluid position is outside of the predetermined position, the fluid is moved to the predetermined position by the moving cover; and, if the fluid position is in the predetermined position, calculating the fluid volume.

25. The system of claim 22, wherein the memory is further configured to store digitally-encoded instructions that, when executed by the processor, apply dark-field imaging is to identify the fluid boundaries.

26. The system of claim 22, wherein the memory is further configured to store digitally-encoded instructions that, when executed by the processor, apply foreground detection to the captured image to identify the fluid boundaries.

27. The system of claim 22, wherein the fluid is a clear fluid and the memory is further configured to store digitally-encoded instructions that, when executed by the processor apply motion-based foreground detection to identify the fluid boundaries.

28. The system of claim 22, wherein the fluid is a colored fluid and the memory is further configured to store digitally-encoded instructions that, when executed by the processor apply color-threshold detection to identify the fluid boundaries.

29. The system of claim 22, wherein the memory is further configured to store digitally-encoded instructions that, when executed by the processor, remove noise from a background of the captured image.

30. The system of claim 22, wherein a distance between the camera and the cover is between about 38.1 cm (15 inches) to about 50.8 cm (20 inches).

31. The system of claim 22, wherein the memory is further configured to store digitally-encoded instructions that, when executed by the processor, cause the processor to perform operations comprising comparing the fluid width to a calibration curve to provide the calculated fluid volume, wherein the calibration curve is prepared by plotting known fluid volumes against corresponding fluid widths.

32. The system of claim 31, wherein the calibration curve is a first-order calibration curve.

33. The system of claim 22, wherein the memory is further configured to store digitally-encoded instructions that, when executed by the processor, cause the processor to perform operations comprising:
   a. detecting bubbles in the dispensed fluid confined to the space between the substrate and the cover by performing circle detection to identify bubbles in the captured image; and
   b. compensating for bubble volume by calculating a number of bubbles and a bubble volume for each bubble, and subtracting a total bubble volume from the calculated volume determined using the fluid width to provide a corrected calculated volume; and
   c. using the corrected calculated volume to calculate the replenishment amount.

34. The system of claim 23, wherein the memory is further configured to store digitally-encoded instructions that, when executed by the processor, cause the processor to perform operations comprising calculating a ratio of bright pixels to dark pixels in the captured image, wherein if the ratio of bright pixels to dark pixels is greater than about 50% in the captured image, the image fails the frame check, and if the ratio of bright pixels to dark pixels is less than about 50% in the captured image, the image passes the frame check.

35. The system of claim 23, wherein the memory is further configured to store digitally-encoded instructions that, when executed by the processor, cause the processor to perform operations comprising comparing the calculated fluid volume to the predetermined fluid volume or at least one previously calculated volume to produce a volume difference, wherein if an absolute value of a ratio of the volume difference and the predetermined fluid volume or the previously calculated volume is greater than a difference calculated using a predetermined evaporation rate of the fluid the image fails the frame check.

36. The system of claim 23, wherein the memory is further configured to store digitally-encoded instructions that, when executed by the processor, cause the processor to perform operations comprising notifying a user if the maximum number of frame check error iterations is reached.

37. The system of claim 23, wherein the maximum number of frame check error iterations is about five iterations.

38. The system of claim 22, further comprising a replenishment dispenser, wherein the memory is further configured to store digitally-encoded instructions that, when executed by the processor, cause the dispenser to replenish the fluid volume by the replenishment amount.

39. The system of claim 24, wherein the memory is further configured to store digitally-encoded instructions that, when executed by the processor, cause the processor to perform operations comprising determining a position of the moving cover, wherein the position of the moving cover correlates to the fluid position, wherein if the position of the moving cover is outside of a predetermined region, then the fluid position is outside of the predetermined position.

40. The system of claim 39, wherein the moving cover comprises a fluid rolling cover and the predetermined region is off-set from a center line of the fluid rolling cover to compensate for a lag in a movement of the fluid position relative to a position of the fluid rolling cover.

41. The system of claim 40, wherein determining the fluid position further comprises determining a direction of movement of the fluid relative the center line of the fluid rolling cover when the fluid rolling cover is moving the fluid across the substrate.

42. The system of claim 22 further comprising a replenishment dispenser under control of the processor, wherein the memory is further configured to store digitally-encoded instructions that, when executed by the processor, cause the replenishment dispenser to deliver the replenishment amount of the fluid to the space between the cover and the substrate.

* * * * *